United States Patent
Bookbinder et al.

(10) Patent No.: US 10,183,885 B2
(45) Date of Patent: Jan. 22, 2019

(54) LASER CUT COMPOSITE GLASS ARTICLE AND METHOD OF CUTTING

(71) Applicant: Corning Incorporated, Corning, NY (US)

(72) Inventors: Dana Craig Bookbinder, Corning, NY (US); Stephan Lvovich Logunov, Corning, NY (US); Sasha Marjanovic, Painted Post, NY (US); Albert Roth Nieber, Painted Post, NY (US); Garrett Andrew Piech, Corning, NY (US); Kamjula Pattabhirami Reddy, Corning, NY (US); Pushkar Tandon, Painted Post, NY (US); Sergio Tsuda, Horseheads, NY (US); Natesan Venkataraman, Painted Post, NY (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/496,393

(22) Filed: Apr. 25, 2017

(65) Prior Publication Data

US 2017/0225996 A1    Aug. 10, 2017

Related U.S. Application Data

(62) Division of application No. 14/530,244, filed on Oct. 31, 2014, now Pat. No. 9,701,563.
(Continued)

(51) Int. Cl.
*C03B 33/02* (2006.01)
*C03B 25/087* (2006.01)
(Continued)

(52) U.S. Cl.
CPC ...... *C03B 33/0222* (2013.01); *B23K 26/0622* (2015.10); *B23K 26/359* (2015.10);
(Continued)

(58) Field of Classification Search
CPC .................................................. C03B 33/0222
(Continued)

(56) References Cited

U.S. PATENT DOCUMENTS

| 1,790,397 A | 1/1931 | Woods et al. |
| 2,682,134 A | 6/1954 | Stookey |

(Continued)

FOREIGN PATENT DOCUMENTS

| CN | 2388062 Y | 7/2000 |
| CN | 1283409 C | 11/2006 |

(Continued)

OTHER PUBLICATIONS

Arimoto, R. et al.; Imaging properties of axicon in a scanning optical system; Applied Optics; Nov. 1, 1991; pp. 6653-6657; vol. 31, No. 31; Optical Society of America.
(Continued)

*Primary Examiner* — Ian A Rummel
(74) *Attorney, Agent, or Firm* — Kevin L. Bray

(57) ABSTRACT

The present disclosure relates to a process for cutting and separating arbitrary shapes of thin substrates of transparent materials, particularly tailored composite fusion drawn glass sheets, and the disclosure also relates to a glass article prepared by the method. The developed laser method can be tailored for manual separation of the parts from the panel or full laser separation by thermally stressing the desired profile. The self-separation method involves the utilization of an ultra-short pulse laser that can be followed by a $CO_2$ laser (coupled with high pressure air flow) for fully automated separation.

8 Claims, 23 Drawing Sheets

Related U.S. Application Data

(60) Provisional application No. 62/023,322, filed on Jul. 11, 2014, provisional application No. 61/917,226, filed on Dec. 17, 2013.

(51) Int. Cl.

| | | |
|---|---|---|
| *C03B 33/07* | (2006.01) | |
| *B23K 26/53* | (2014.01) | |
| *B23K 26/0622* | (2014.01) | |
| *B23K 26/402* | (2014.01) | |
| *C03B 17/06* | (2006.01) | |
| *C03B 33/09* | (2006.01) | |
| *B23K 26/359* | (2014.01) | |
| *B23K 103/00* | (2006.01) | |
| *B23K 103/16* | (2006.01) | |

(52) U.S. Cl.
CPC ............ *B23K 26/402* (2013.01); *B23K 26/53* (2015.10); *C03B 17/064* (2013.01); *C03B 25/087* (2013.01); *C03B 33/0215* (2013.01); *C03B 33/07* (2013.01); *C03B 33/091* (2013.01); *B23K 2103/166* (2018.08); *B23K 2103/54* (2018.08)

(58) Field of Classification Search
USPC ...................................................... 428/195.1
See application file for complete search history.

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett |
| 5,400,350 A | 3/1995 | Galvanauskas et al. |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,038,055 A | 3/2000 | Hansch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,576 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,158,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,695 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramev et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abrarnov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,857 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097488 A1 | 7/2002 | Yamaguchi et al. |
| 2002/0110639 A1 | 8/2002 | Bruns |

(56) References Cited

U.S. PATENT DOCUMENTS

| | | |
|---|---|---|
| 2003/0006221 A1 | 1/2003 | Hong et al. |
| 2005/0024743 A1 | 2/2005 | Camy-Peyret |
| 2005/0098548 A1 | 5/2005 | Kobayashi et al. |
| 2005/0116938 A1 | 6/2005 | Sawaki et al. |
| 2005/0274702 A1 | 12/2005 | Deshi |
| 2006/0011593 A1 | 1/2006 | Fukuyo |
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0289410 A1 | 12/2006 | Morita et al. |
| 2007/0051706 A1* | 3/2007 | Bovatsek ........... B23K 26/0617 219/121.69 |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089682 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani |
| 2011/0049765 A1 | 3/2011 | Li et al. |
| 2011/0088324 A1 | 4/2011 | Wessel |
| 2011/0094267 A1 | 4/2011 | Aniolek et al. |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandström |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165396 A1 | 6/2015 | Marjanovic et al. |
| 2015/0165548 A1 | 6/2015 | Marjanovic et al. |
| 2015/0165560 A1 | 6/2015 | Heckert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0350991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |

(56) References Cited

U.S. PATENT DOCUMENTS

| | | | |
|---|---|---|---|
| 2016/0060156 A1 | 3/2016 | Krueger et al. | |
| 2016/0280580 A1 | 9/2016 | Bohme | |
| 2016/0290791 A1 | 10/2016 | Buono et al. | |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| DE | 2231330 A1 | 10/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 | 11/1994 |
| JP | 9106243 A | 4/1997 |
| JP | 11197498 | 7/1999 |
| JP | 11269683 | 10/1999 |
| JP | 11330597 | 11/1999 |
| JP | 11347758 | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2013007842 A | 1/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201226345 | 7/2012 |
| WO | 1999029243 | 6/1999 |
| WO | 1999063900 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 8/2015 |
| WO | 2015127583 A1 | 9/2015 |
| WO | 2016010954 A2 | 1/2016 |

OTHER PUBLICATIONS

Betriebsanleitung; TruMicro 5000; Aug. 2011; pp. 1-4.
Bhuyan, M. et al.; High aspect ratio nanochannel machining using single shot femtosecond Bessel beams; Applied Physics Letters; Aug. 23, 2010; pp. 081102-1-081102-3; vol. 97.
Bhuyan, M. et al.; High aspect ratio taper-free microchannel fabrication using femtosecond Bessel beams; Optics Express; Jan. 18, 2010; pp. 566-574; vol. 18, No. 2; Optical Society of America.
Cubeddu, R. et al.; A compact time-resolved reflectance system for dual-wavelength multichannel assessment of tissue absorption and

(56) References Cited

OTHER PUBLICATIONS scattering; SPIE Conference on Optical Tomography and Spectroscopy of Tissue III; San Jose, California; Jan. 1999; pp. 450-455; vol. 3597; SPIE.
Cubeddu, R. et al.; Compact tissue oximeter based on dual-wavelength multichannel time-resolved reflectance; Applied Optics; Jun. 1, 1999; pp. 3670-3680; vol. 38, No. 16; Optical Society of America.
Ding, Z. et al.; High-resolution optical coherence tomography over a large depth range with an axicon lens; Optics Letters; Feb. 15, 2002; pp. 243-245; vol. 27, No. 4; Optical Society of America.
EagleEtch; TheAnti-glare Glass for Technical Display Applications; Glass and Polymer Technologies; pp. 1-8; EuropTec USA Inc.
Girkin, J. et al.; Macroscopic multiphoton biomedical imaging using semiconductor saturable Bragg reflector modelocked Lasers; SPIE Conference on Commercial and Biomedical Applications of Ultrafast Lasers; San Jose, California; Jan. 1999; pp. 92-98; vol. 3616; SPIE.
Glezer, E. et al.; Ultrafast-laser driven micro-explosions in transparent materials; Applied Physics Letters; 1997; pp. 882-884, vol. 71.
Golub, I.; Fresnel axicon; Optics Letters; Jun. 15, 2006; pp. 1890-1892;. vol. 31, No. 12; Optical Society of America.
Herman, P. et al.; Laser micromachining of 'transparent' fused silica with 1-ps pulses and pulse trains; SPIE Conference on Commercial and Biomedical Applications of Ultrafast Lasers; San Jose, California; Jan. 1999; pp. 148-155; vol. 3616; SPIE.
Kosareva, O. et al.; Formation of extended plasma channels in a condensed medium upon axicon focusing of a femtosecond laser pulse; Quantum Electronics; 2005; pp. 1013-1014; vol. 35, No. 11; Kvantovaya Elektronika and Turpion Ltd.
Kruger, J. et al.; Femtosecond-pulse visible laser processing of transparent materials; Applied Surface Science; 1996; pp. 430-438; Elsevier B.V.
Kruger, J. et al.; Laser micromachining of barium aluminium borosilicate glass with pulse durations between 20 fs and 3 ps; Applied Surface Science; 1998; pp. 892-898; Elsevier B.V.
Kruger, J. et al.; Structuring of dielectric and metallic materials with ultrashort laser pulses between 20 fs and 3 ps; SPIE Proceedings; San Jose, California; Feb. 8, 1997; pp. 40-47 vol. 2991; SPIE.
Lapczyna, M. et al.; Ultra high repetition rate (133 MHz) laser ablation of aluminum with 1.2-ps pulses; Applied Physics a Materials Science & Processing; Dec. 28, 1999; pp. S883-S886; vol. 69 (Suppl).; Springer-Verlag.
Perry, M. et al.; Ultrashort-Pulse Laser Machining; Lawrence Livermore National Laboratory; Sep. 1998; pp. i-30.
Perry, M. et al.; Ultrashort-Pulse Laser Machining; International Congress on Applications of Lasers and Electro-Optics; Orlando, Florida; Nov. 16-19, 1998; pp. 1-24.
Perry, M. et al; Ultrashort-pulse laser machining of dielectric materials; Journal of Applied Physics; May 1, 1999; pp. 6803-6810; vol. 85, No. 9; American Institute of Physics.
Pharos High-power Femtosecond Laser System specification; Light Conversion; 2011; pp. 1-2.
Polynkin, P. et al.; Extended filamentation with temporally chirped femtosecond Bessel-Gauss beams in air; Optics Express; Jan. 19, 2009; pp. 575-584; vol. 17, No. 2; Optical Society of America.
Serafetinides, A. et al.; Ultra-short pulsed laser ablation of polymers; Applied Surface Science; 2011; pp. 42-56; vol. 180; Elsevier Science B.V.
Sundaram, S. et al.; Inducing and probing non-thermal transitions in semiconductors using femtosecond laser pulses; Nature Materials; Dec. 2002; pp. 217-224; vol. 1; Nature Publishing Group.
Vanagas, E. et al.; Glass cutting by femtosecond pulsed irradiation; Journal of Micro/Nanolithography, MEMS, and MOEMS; Mar. 31, 2004; pp. 1-18; vol. 3, Issue 2; SPIE.
Varel, H. et al.; Micromachining of quartz with ultrashort laser pulses; Applied Physics a Materials Science & Processing; 1997; pp. 367-373; vol. 65.

Yoshino, F. et al.; Micromachining with a High Repetition Rate Femtosecond Fiber Laser; JLMN—Journal of Laser Micro/Nanoengineering; 2008; pp. 157-162; vol. 3, No. 3.
Zeng, D. et al.; Characteristic analysis of refractive axicon system for optical trepanning; Optical Engineering; Sep. 2006; pp. 094302-1-094302-10; vol. 45, No. 9.
Zhang, G. et al.; Design of diffractive-phase axicon illuminated by a Gaussian-profile beam; Acta Physica Sinica; May 1996; pp. 354-364; vol. 5, No. 5; Chin. Phys. Soc.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics a Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning Eagle AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics a Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution ofexicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.

(56) References Cited

OTHER PUBLICATIONS

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics a Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am, A; Aug. 2007; pp. 2296-2312; vol. 24, No. 8; Optical Society of America.

Salleo, A. et al.; Machining of transparent materials using an IR and UV nanosecond pulsed laser; Applied Physics a Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.

Shealy, D. et al; Geometric optics-based design of laser beam shapers; Opt. Eng.; Nov. 2003; pp. 3123-3138; vol. 42, No. 11; Society of Photo-Optical Instrumentation Engineers.

Yan, Y. et al.; Fiber structure to convert a Gaussian beam to higher-order optical orbital angular momentum modes: modes; Optics Letters; Aug. 15, 2012; pp. 3294-3296; vol. 37, No. 16; Optical Society of America.

Abramov, A. et al.; Laser separation of chemically strengthened glass; ScienceDirect Physics Procedia; 2010; pp. 285-290; vol. 5; Elsevier B.V.

Stoian, R. et al.; Spatial and temporal laser pulse design for material processing on ultrafast scales; Applied Physics a Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. Of SPIE; 2014; pp. 896711-1-896711-8; vol. 8967; SPIE.

Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

\* cited by examiner

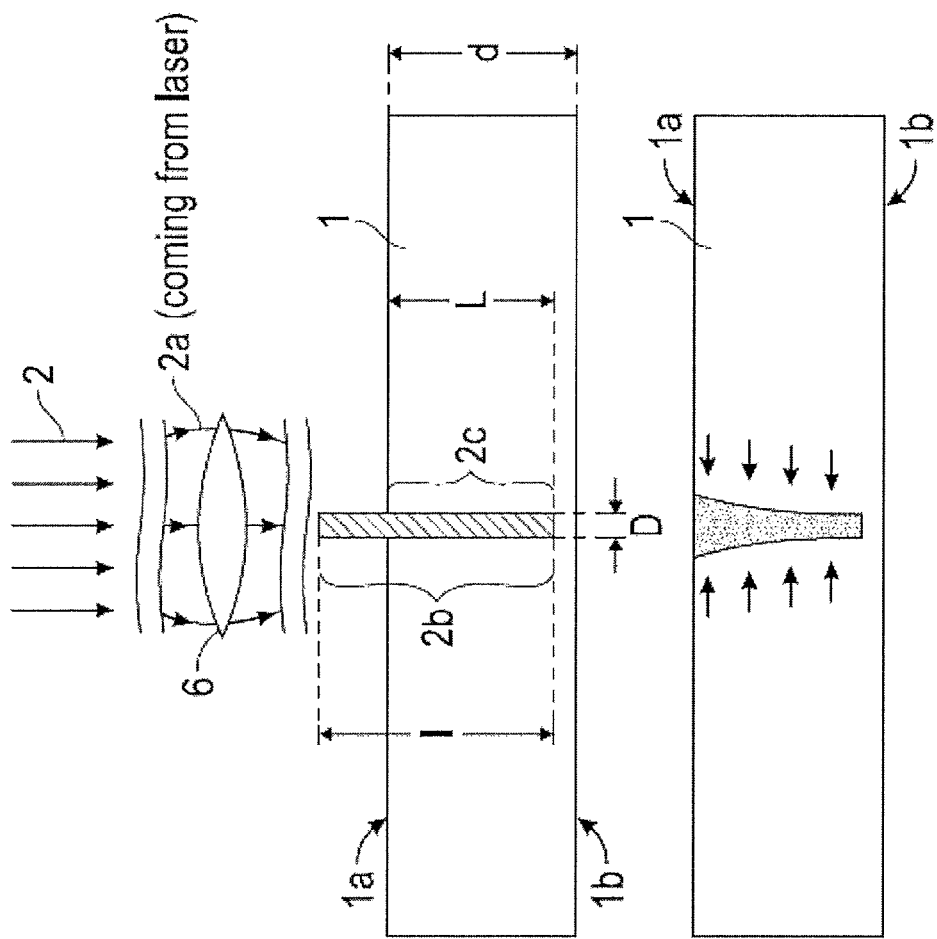

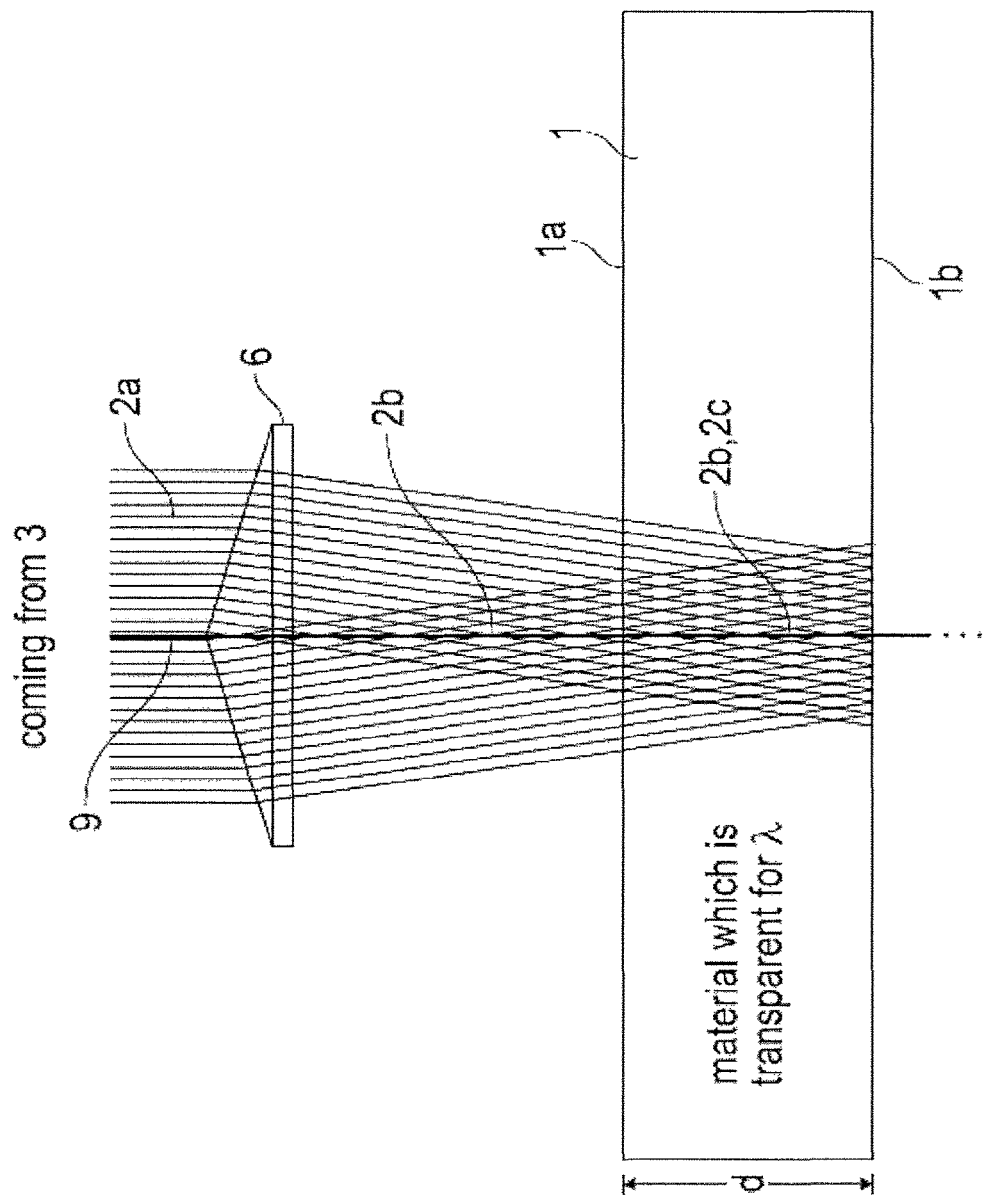

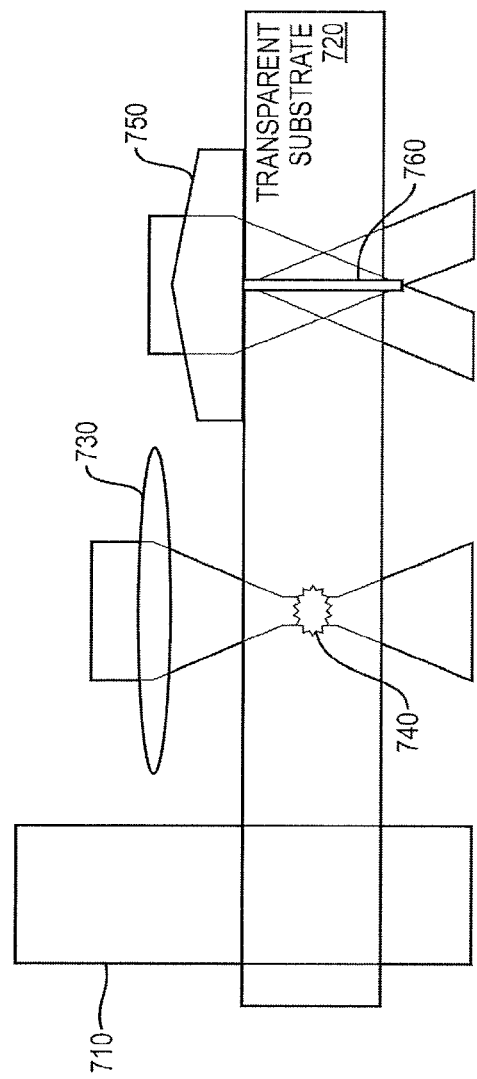

Laser creating fault line through the sample    Edge with defect line after separation Actual picture of a separated edge

LASER CUT COMPOSITE GLASS ARTICLE AND METHOD OF CUTTING

RELATED APPLICATIONS

This application is a divisional application and claims the benefit of U.S. patent application Ser. No. 14/530,244 filed on Oct. 31, 2014, which claims priority from U.S. Provisional Application No. 61/917,226 filed on Dec. 17, 2013, and U.S. Provisional Application No. 62/023,322 filed on Jul. 11, 2014, the entire disclosures of which are incorporated herein by reference.

BACKGROUND

The area of laser processing of materials encompasses a wide variety of applications that involve cutting, drilling, milling, welding, melting, etc. and different types of materials. Among these applications, one that is of particular interest is cutting or separating different types of substrates such as multi-layered composite fusion drawn glass substrates.

From process development and cost perspectives there are many opportunities for improvement in cutting and separation of composite glass substrates. It is of great interest to have a faster, cleaner, cheaper, more repeatable and more reliable method of glass separation than is currently practiced in the market today. Among several alternative technologies, laser separation has been successfully demonstrated using different approaches. The techniques range from: 1) actual removal of material between the boundaries of the desired part (or parts) and its matrix; 2) creation of defects within the bulk of the material to weaken or seed it with cracking initiation points along the perimeter of the desired profile followed by a secondary breaking step; and 3) propagation of an initial crack by thermal stress separation. These laser cutting processes have demonstrated the potential economic and technical advantages such as precision, good edge finish, and low residual stress compared to competing technologies (mechanical scribing and breaking, high pressure water jet and ultrasonic milling, etc).

There is nevertheless a continuing need for an improved process for cutting and separating multi-layered composite fusion drawn glass substrates.

SUMMARY

The present application relates to the production of cut composite glass articles with finished edges, and the method of cutting the articles with one or more lasers.

In one embodiment, a method of laser processing a fusion formed glass composite workpiece includes focusing a pulsed laser beam into a laser beam focal line oriented along the beam propagation direction and directed into the fusion formed glass composite workpiece, the laser beam focal line generating an induced absorption within the workpiece, and the induced absorption producing a defect line along the laser beam focal line within the workpiece. The method also includes translating the workpiece and the laser beam relative to each other along a contour, thereby forming a plurality of defect lines within the workpiece, the defect lines being spaced apart by a distance between 0.5 micron and 20 microns. The laser beam focal line can have a length in a range of between 0.01 mm and about 100 mm. More preferably, the focal line length can be in a range of between about 0.1 mm and about 10 mm. Even more preferably, the laser beam focal line has a length in a range of between about 0.1 mm and about 1 mm. The pulsed laser beam can have an average laser energy measured, at the material, greater than 40 µJ per mm thickness of material. In another embodiment, a glass article is made by the above method.

In another embodiment, a glass article includes a glass composite having a first surface, a second surface, and at least one edge having a plurality of defect lines extending at least 250 microns between the first and second surfaces. Each of the defect lines has a diameter less than or equal to about 5 microns. The glass composite can be a fusion formed glass composite. The spacing of adjacent defect lines can be between 0.1 micron and 20 microns. The glass article can include three layers, with the outermost layers including a first composition with a coefficient of thermal expansion CTE1, and a thickness TH1; an inner layer situated between the outermost layers and including a second composition that is different from the first composition and has a coefficient of thermal expansion CTE2, and a thickness TH2; and wherein CTE1 can be greater than CTE2. The outermost glass layers can be under compressive stress, and the inner layer can be under tensile stress, and the ratio of TH2 to TH1 can be between 4 and 20. The glass article can have a central tension of the inner layer greater than 5 megapascals (MPa), and the defect lines can extend the full thickness of the edge. The edge can have an Ra surface roughness less than about 0.5 micron, and the edge can have subsurface damage up to a depth less than or equal to about 75 microns.

The combination of the fusion formed composite glass sheets and the laser cutting methods described below yields a composite glass article with superior edge strength, 4-point bend strength, and surface finish with negligible debris and minimum damage to part edges that preserves strength.

The present disclosure extends to:

A method of laser processing a fusion formed glass composite workpiece, the method comprising:

focusing a pulsed laser beam into a laser beam focal line oriented along the beam propagation direction and directed into the fusion formed glass composite workpiece, the laser beam focal line generating an induced absorption within the workpiece, and the induced absorption producing a defect line along the laser beam focal line within the workpiece; and translating the workpiece and the laser beam relative to each other along a contour, thereby forming a plurality of defect lines within the workpiece, the defect lines being spaced apart by a distance between 0.5 micron and 20 microns.

The present disclosure extends to:

A glass article comprising: a glass composite having a first surface, a second surface, and at least one edge having a plurality of defect lines extending at least 250 microns between the first and second surfaces, the defect lines each having a diameter less than or equal to about 5 microns.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating exemplary embodiments.

FIGS. 2A and 2B are illustrations of the positioning of the laser beam focal line and formation of a defect line in a region of induced nonlinear absorption along the laser beam focal line.

FIGS. 3B1-4 illustrate various possibilities to process the substrate by differently positioning the laser beam focal line relative to the substrate or workpiece.

FIG. 4 is an illustration of a second embodiment of an optical assembly for laser processing.

FIGS. 7A-7C show different laser intensity regimes for laser processing of materials. FIG. 7A illustrates an unfocused laser beam, FIG. 7B illustrates a condensed laser beam with a spherical lens, and FIG. 7C illustrates a condensed laser beam with an axicon or diffractive Fresnel lens.

DETAILED DESCRIPTION

Figure 1:
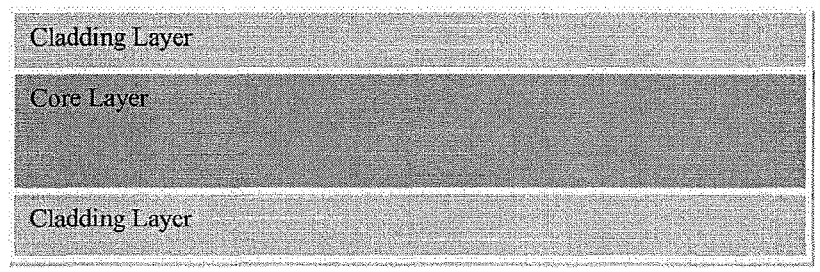
FIG. 1 is an illustration of a composite glass sheet.

A description of example embodiments follows.

Embodiments described herein relate to methods for cutting and separating arbitrary shapes of thin substrates of transparent materials, particularly tailored composite fusion drawn glass sheets. The materials should preferably be substantially transparent to the selected laser wavelength (i.e., absorption less than about 10% and preferably less than about 1% per mm of material depth). The laser method can be tailored for manual separation of the parts from the panel or full laser separation by thermal stressing the desired profile. The self-separation method involves the utilization of an ultra-short pulse laser that can be followed by a $CO_2$ laser (coupled with high pressure air flow) for fully automated separation.

A goal of the cutting is to provide precision cutting and separation of arbitrary shapes articles both with and without internal holes or slots out of thin substrate of composite glass. The process separates parts in a controllable fashion with negligible debris and minimum defects and low subsurface damage to the edges of the separated parts. Minimal defects and low subsurface damage at the edges of the separated part preserves part strength and prevents part failure upon external impacts. The laser method is well suited to materials that are transparent to the selected laser wavelength. Demonstrations of the cutting method have been made using composite sheets of between 0.7 mm and 1.2 mm in sheet thickness, but it is conceived that composite sheets of any thickness may be cut using the disclosed method.

Subsurface damage, which includes small microcracks and material modifications caused by a cutting process and which are oriented roughly perpendicular to a cut surface, is a concern for the edge strength of glass or other brittle materials.

As used herein, subsurface damage refers to the maximum size (e.g. length, width, diameter) of structural imperfections in the perimeter surface of the part separated from the substrate or material subjected to laser processing in accordance with the present disclosure. Since the structural imperfections extend from the perimeter surface, subsurface damage may also be regarded as the maximum depth from the perimeter surface in which damage from laser processing in accordance with the present disclosure occurs. The perimeter surface of the separated part may be referred to herein as the edge or the edge surface of the separated part. The structural imperfections may be cracks or voids and represent points of mechanical weakness that promote fracture or failure of the part separated from the substrate or material. By minimizing the size of subsurface damage, the present method improves the structural integrity and mechanical strength of separated parts.

The depth of subsurface damage can be measured by using a confocal microscope to look at the cut surface, the microscope having an optical resolution of a few nm. Surface reflections are ignored, while cracks are probed within the material, the cracks showing up as bright lines. The microscope is focused into the material until there are no more "sparks," collecting images at regular intervals. The images are manually processed by looking for cracks and tracing them through the depth of the glass to determine a maximum depth (typically measured in microns) of subsurface damage. There are typically many thousands of microcracks, so typically only the largest microcracks are measured. This process is typically repeated on about 5 locations of a cut edge. Although the microcracks are roughly perpendicular to the cut surface, any cracks that are directly perpendicular to the cut surface may not be detected by this method.

With the methods described herein, sub-surface damage is minimized and limited to a small region in the vicinity of the edge. Sub-surface damage may be limited to a depth relative to the surface of an edge of 100 μm or less, or 75 μm or less, or 60 μm or less, or 50 μm or less, and the cuts may produce only low debris. Cutting of a transparent material with a laser in accordance with the present disclosure may also be referred to herein as drilling or laser drilling or laser processing.

The fundamental step of the laser method is to create a fault line that delineates the desired shape of a part and establishes a path of least resistance for crack propagation and hence separation and detachment of the shaped part from its surrounding substrate matrix. The fault line consists of a series of closely spaced defect lines (also referred to herein as perforations, holes, or damage tracks) that are formed by a laser. The laser separation method can be tuned and configured to enable manual or mechanical separation, partial separation or total separation of glass parts of desired shapes out of the original substrate.

In the first step the material (e.g. object or workpiece) to be processed is irradiated with an ultra-short pulsed laser beam that is condensed into a high aspect ratio line focus (referred to herein as a laser beam focal line) that penetrates the substrate. Within this volume of high energy density laser irradiation, the material is modified via nonlinear effects. It is important to note that optical intensity above a critical threshold is needed to induce nonlinear absorption. Below the critical intensity threshold, the material is transparent to the laser radiation and remains in its original state. By scanning the laser over a desired line or path we create a fault line (a few microns wide) consisting of a series of defect lines. The fault line defines the perimeter or shape of a part to be separated in a subsequent processing step.

The selection of a laser source is predicated on the ability to induce nonlinear absorption in transparent materials, including fusion formed glass composite workpieces. Nonlinear absorption includes multi-photon absorption (MPA). MPA is the simultaneous absorption of multiple (two or more) photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two or more photons. MPA is a nonlinear process that is generally several orders of magnitude weaker than linear absorption. It differs from linear absorption in that the strength of MPA depends on the square or higher power of the light intensity, thus making it a nonlinear optical process. At ordinary light intensities, MPA is negligible. If the light intensity (energy density) is extremely high (above the critical threshold), such as in the region of focus of a laser source (particularly a pulsed laser source) including the laser beam focal line described herein, MPA becomes appreciable and leads to measurable effects in the material within the region where the energy density of the light source is sufficiently high. Within the focal region, the energy density may also be sufficiently high to result in ionization.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example. Thus, atoms and bonds can be selectively excited or ionized in the regions of a material where the energy density of the laser beam is sufficiently high to induce nonlinear TPA of a laser wavelength having half the required excitation energy, for example.

MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line, damage line, or "perforation") that mechanically weakens the material and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the material. In one embodiment, micromachining includes separation of a part from the material processed by the laser, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

The preferred laser is an ultrashort pulsed laser (pulse durations on the order tens of picoseconds or shorter) that can be operated in pulse mode or burst mode. In pulse mode, a series of nominally identical single pulses is emitted from the laser and directed to the workpiece. In pulse mode, the repetition rate of the laser is determined by the spacing in time between the pulses. In burst mode, bursts of pulses are emitted from the laser, where each burst includes two or more pulses (of equal or different amplitude). In burst mode, pulses within a burst are separated by a first time interval (which defines a pulse repetition rate for the burst) and the bursts are separated by a second time interval (which defines a burst repetition rate), where the second time interval is typically much longer than the first time interval. As used herein (whether in the context of pulse mode or burst mode), time interval refers to the time difference between corresponding parts of a pulse or burst (e.g. leading edge-to-leading edge, peak-to-peak, or trailing edge-to-trailing edge). Pulse and burst repetition rates are controlled by the design of the laser and can typically be adjusted, within limits, by adjusting operating conditions of the laser. Typical pulse and burst repetition rates are in the kHz to MHz range.

The laser pulse duration (in pulse mode or for pulses within a burst in burst mode) may be $10^{-10}$ s or less, or $10^{-11}$ s or less, or $10^{-12}$ s or less, or $10^{-13}$ s or less. In the exemplary embodiments described herein, the laser pulse duration is greater than $10^{-15}$.

The perforations may be spaced apart and precisely positioned by controlling the velocity of a substrate or stack relative to the laser through control of the motion of the laser and/or the substrate or stack. As an example, in a thin transparent substrate moving at 200 mm/sec exposed to a 100 kHz series of pulses (or bursts of pulses), the individual pulses would be spaced 2 microns apart to create a series of perforations separated by 2 microns. This defect line (perforation) spacing is sufficiently close to allow for mechanical or thermal separation along the contour defined by the series of perforations. Distance between adjacent defect lines along the direction of the fault lines can, for example, be in the range from 0.25 μm to 50 μm, or in the range from 0.50 μm to about 20 μm, or in the range from 0.50 μm to about 15 μm, or in the range from 0.50 μm to 10 μm, or in the range from 0.50 μm to 3.0 μm or in the range from 3.0 μm to 10 μm.

Once the fault line with vertical defects is created, separation can occur via: 1) manual or mechanical stress on or around the fault line; the stress or pressure should create tension that pulls both sides of the fault line apart to break the areas that are still bonded together; 2) using a heat source, create a stress zone around the fault line to put the vertical defect line in tension and induce partial or total self-separation. In both cases, separation depends on several of the process parameters, such as laser scan speed, laser power, parameters of lenses, pulse width, repetition rate, etc.

Fusion formed glass composite sheets can be made by a multi-layer fusion draw system. As shown in FIG. 1, the composite consists of at least one outer cladding layer on each surface of the core layer. The cladding layers are also referred to as outer or outermost layers herein, and the core layer is also referred to as an inner layer herein. In one embodiment, the glass composites have a core layer that is intermediate to high coefficient of thermal expansion (CTE) glass, while the outer layers are low CTE glasses. The sheets have a naturally pre-stressed central core, based upon the compositional difference between the core and the cladding layers. Such composite sheets are frequently difficult to cut and separate into usable parts free from damage. In addition, the creation of internal openings (e.g. slots or holes) within separated parts can be difficult.

The present disclosure is concerned with separation of parts (also referred to herein as articles) from composite glass sheets, such as those with tailored core and cladding regions of the type shown in FIG. 1. Representative compositions of the core and cladding glasses are as follows: The cladding layer is a glass composition comprising from about 60 mol. % to about 66 mol. % $SiO_2$; from about 7 mol. % to about 10 mol. % $Al_2O_3$; from about 14 mol. % to about 18 mol. % $B_2O_3$; and from about 9 mol. % to about 16 mol. % alkaline earth oxide, wherein the alkaline earth oxide comprises at least CaO and the CaO is present in the glass composition in a concentration from about 3 mol. % to about 12 mol. %; and wherein the glass composition is substantially free from alkali metals and compounds containing alkali metals. A specific cladding layer glass composition is shown in Table 1.

TABLE 1

Cladding glass composition

| Component | Mol % |
|---|---|
| $SiO_2$ | 64.59 |
| $Al_2O_3$ | 7.38 |
| $B_2O_3$ | 16.45 |
| MgO | 2.21 |
| CaO | 8.14 |
| SrO | 1.11 |

Representative core glass compositions comprise: about 60 mol % to about 75 mol % $SiO_2$, about 2 mol % to about 11 mol % $Al_2O_3$, 0 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and, about 3 mol % to about 16 mol % R'O, wherein R'O comprises the combined mol % of MgO, CaO, SrO, and BaO in the composition. A specific core glass composition is shown in Table 2.

TABLE 2

Core glass composition

| Component | Mol % |
|---|---|
| $SiO_2$ | 63.46 |
| $Al_2O_3$ | 9.56 |
| $B_2O_3$ | 7.09 |
| $K_2O$ | 5.79 |
| MgO | 2.49 |
| CaO | 7.41 |
| SrO | 3.95 |

Laser drilling and separation of fusion formed glass composite sheets shown in FIG. 1 are accomplished using the method described below.

The laser cutting method relies on the material transparency to the laser wavelength in the linear intensity regime, or low laser intensity, which allows maintenance of high surface quality and reduced subsurface damage created by the area of high intensity around the laser focus. An edge of a workpiece can have subsurface damage up to a depth less than or equal to about 75 microns, for example, by using the methods described herein. One of the key enablers of this process is the high aspect ratio of the defect created by the ultra-short pulsed laser. It allows creation of a defect line that extends from the top to the bottom surfaces of the material to be cut. In principle, the defect line can be created by a single pulse or a single burst of pulses and if desired, additional pulses or bursts can be used to form the defect line or to increase the extension of the affected area (e.g. depth and width).

The method to cut and separate transparent materials is essentially based on creating a fault line in the material to be processed with an ultra-short pulsed laser, where the fault consists of a series of defect lines arranged to define the desired perimeter of a part to be separated from the material. Depending on the material properties (absorption, CTE, stress, composition, etc.) and laser parameters chosen for processing the material, the creation of a fault line alone may suffice to induce self-separation. In this case, no secondary separation processes, such as tension/bending forces, heating, or $CO_2$ laser, are necessary.

In some cases, a fault line created along a contour defined by a series of perforations or defect lines is not enough to separate the part spontaneously and a secondary step may be necessary. If so desired, a second laser can be used to create thermal stress to separate the part, for example. In the case of fusion formed glass composites, we found that separation can be achieved, after the creation of a fault line, by application of mechanical force or by using a $CO_2$ laser to create thermal stress to effect separation of the part. Another option is to have the $CO_2$ laser only start the separation and finish the separation manually. The optional $CO_2$ laser separation is achieved with a defocused cw laser emitting at 10.6 microns with power adjusted by controlling its duty cycle. Focus change (i.e., extent of defocusing) is used to vary the induced thermal stress by varying the spot size. Defocused laser beams include those laser beams that produce a spot size larger than a minimum, diffraction-limited spot size on the order of the size of the laser wavelength. For example, defocused spot sizes of about 7 mm, 2 mm and 20 mm can be used for $CO_2$ lasers, for example, whose diffraction-limited spot size is much smaller given the emission wavelength of 10.6 microns.

There are several methods to create the defect line. The optical method of forming the line focus can take multiple forms, using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached to create breakdown of the substrate or workpiece material in the region of focus in the substrate material or fusion formed glass composite workpiece through nonlinear optical effects.

In the present application, an ultra-short pulsed laser is used to create a high aspect ratio vertical defect line in a consistent, controllable and repeatable manner. The details of the optical setup that enables the creation of this vertical defect line are described below, and in U.S. Application No. 61/752,489 filed on Jan. 15, 2013, the entire contents of which are incorporated by reference as if fully set forth herein. The essence of this concept is to use an axicon lens element in an optical lens assembly to create a region of high aspect ratio, taper-free microchannels using ultra-short (picoseconds or femtosecond duration) Bessel beams. In other words, the axicon condenses the laser beam into a high intensity region of cylindrical shape and high aspect ratio (long length and small diameter) in the substrate material. Due to the high intensity created with the condensed laser beam, nonlinear interaction of the electromagnetic field of the laser and the substrate material occurs and the laser energy is transferred to the substrate to effect formation of defects that become constituents of the fault line. However, it is important to realize that in the areas of the material where the laser energy intensity is not high (e.g., glass volume of substrate surrounding the central convergence line), the material is transparent to the laser and there is no mechanism for transferring energy from the laser to the material. As a result, nothing happens to the glass or workpiece when the laser intensity is below the nonlinear threshold.

Figure 3A:
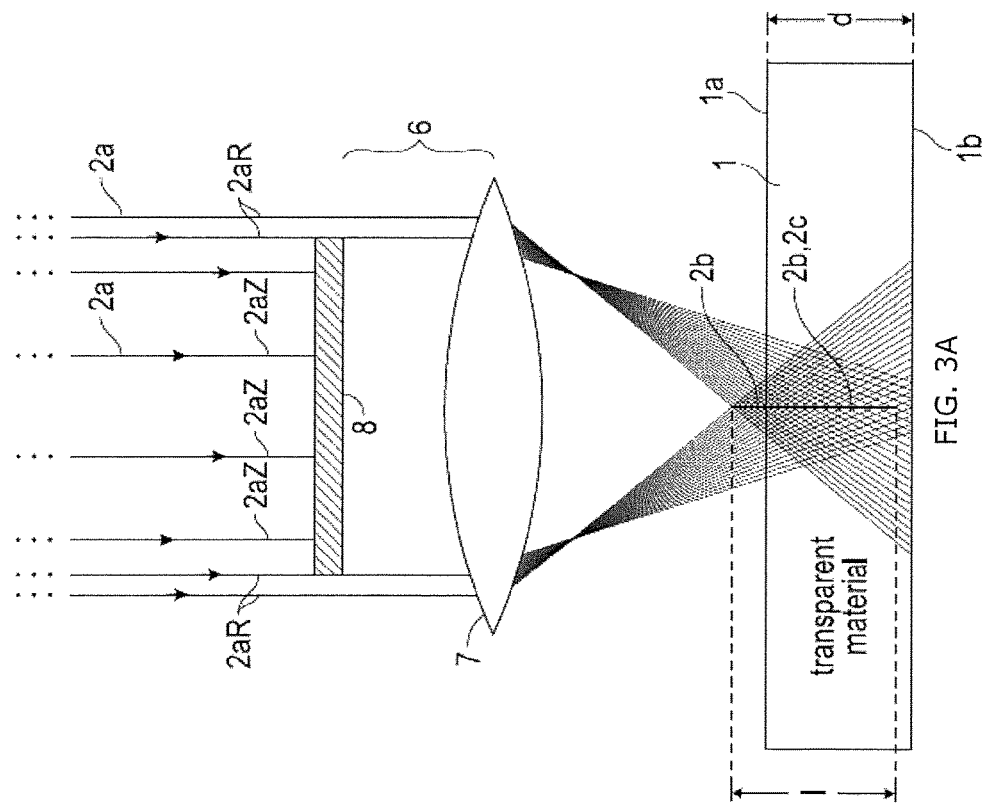
FIG. 3A is an illustration of an optical assembly for laser processing according to one embodiment.

Turning to FIGS. 2A and 2B, a method of laser processing a material includes focusing a pulsed laser beam 2 into a laser beam focal line 2b oriented along the beam propagation direction. Laser beam focal line 2b can be created by several ways, for example, Bessel beams, Airy beams, Weber beams and Mathieu beams (i.e, non-diffractive beams), whose field profiles are typically given by special functions that decay more slowly in the transverse direction (i.e. direction of propagation) than the Gaussian function. As shown in FIG. 3A, laser 3 (not shown) emits laser beam 2, which has a portion 2a incident to the optical assembly 6. The optical assembly 6 turns the incident laser beam into a laser beam focal line 2b on the output side over a defined expansion range along the beam direction (length l of the focal line). The planar substrate 1 is positioned in the beam path to at least partially overlap the laser beam focal line 2b of laser beam 2. The laser beam focal line is thus directed into the substrate. Reference 1a designates the surface of the planar substrate facing the optical assembly 6 or the laser, respectively, and reference 1b designates the reverse (remote) surface of substrate 1. The substrate or workpiece thickness (in this embodiment measured perpendicularly to the planes 1a and 1b, i.e., to the substrate plane) is labeled with d. The substrate or workpiece can also be referred to as a material and can be a glass article that is substantially transparent to the wavelength of the laser beam 2, for example.

As FIG. 2A depicts, substrate 1 (or the fusion formed glass composite workpiece) is aligned substantially perpendicular to the longitudinal beam axis and thus behind the same focal line 2b produced by the optical assembly 6 (the substrate is perpendicular to the plane of the drawing). The focal line being oriented or aligned along the beam direction, the substrate is positioned relative to the focal line 2b in such a way that the focal line 2b starts before the surface 1a of the substrate and stops before the surface 1b of the substrate, i.e. focal line 2b terminates within the substrate and does not extend beyond surface 1b. In the overlapping area of the laser beam focal line 2b with substrate 1, i.e. in the substrate material covered by focal line 2b, the laser beam focal line 2b generates (assuming suitable laser intensity along the laser beam focal line 2b, which intensity is ensured by the focusing of laser beam 2 on a section of length l, i.e. a line focus of length l) a section 2c (aligned along the longitudinal beam direction) along which an induced nonlinear absorption is generated in the substrate material. The induced nonlinear absorption produces defect line formation in the substrate material along section 2c.

The defect line is a microscopic (e.g., >100 nm and <0.5 micron in diameter) elongated "hole" (also referred to herein as perforations or damage tracks) in a substantially transparent material that is created using a one or more high energy pulses or one or more bursts of high energy pulses. The perforations represent regions of the substrate material modified by the laser. The laser-induced modifications disrupt the structure of the substrate material and constitute sites of mechanical weakness. Structural disruptions include compaction, melting, dislodging of material, rearrangements, and bond scission. The perforations extend into the interior of the substrate material and have a cross-sectional shape consistent with the cross-sectional shape of the laser (generally circular). The average diameter of the perforations may be in the range from 0.1 µm to 50 µm, or in the range from 1 µm to 20 µm, or in the range from 2 µm to 10 µm, or in the range from 0.1 µm to 5 µm. In some embodiments, the perforation is a "through hole", which is a hole or an open channel that extends from the top to the bottom of the substrate material. In some embodiments, the perforation may not be a continuously open channel and may include sections of solid material dislodged from the substrate material by the laser. The dislodged material blocks or partially blocks the space defined by the perforation. One or more open channels (unblocked regions) may be dispersed between sections of dislodged material. The diameter of the open channels is <1000 nm, or <500 nm, or <400 nm, or <300 nm or in the range from 10 nm to 750 nm, or in the range from 100 nm to 500 nm. The disrupted or modified area (e.g, compacted, melted, or otherwise changed) of the material surrounding the holes in the embodiments disclosed herein, preferably has diameter of <50 µm (e.g, <10 µm).

Individual perforations can be created at rates of several hundred kilohertz (several hundred thousand perforations per second), for example. With relative motion between the laser source and the material, the perforations can be placed adjacent to one another (spatial separation varying from sub-micron to several or even tens of microns as desired). This spatial separation (pitch) can be selected to facilitate separation of the material or workpiece. In some embodiments, the defect line is a "through hole", which is a hole or an open channel that extends from the top to the bottom of the substantially transparent material. The defect line formation is not only local, but extends over the entire length of section 2c of the induced absorption. The length of section 2c (which corresponds to the length of the overlapping of laser beam focal line 2b with substrate 1) is labeled with reference L. The average diameter or extent of the section of the induced absorption 2c (or the sections in the material of substrate 1 undergoing the defect line formation) is labeled with reference D. This average extent D basically corresponds to the average diameter δ of the laser beam focal line 2b, that is, an average spot diameter in a range of between about 0.1 micron and about 5 microns. Spot diameter D of a Bessel beam can be written as $D=(2.4048\lambda)/(2\pi B)$, where $\lambda$ is the laser beam wavelength and B is a function of the axicon angle.

As FIG. 2A shows, the substrate material (which is transparent to the wavelength $\lambda$ of laser beam 2) is heated due to the induced absorption along the focal line 2b arising from the nonlinear effects (e.g. two-photon absorption, multi-photon absorption) associated with the high intensity of the laser beam within focal line 2b. FIG. 2B illustrates that the heated substrate material will eventually expand so that a corresponding induced tension leads to micro-crack formation, with the tension being the highest at surface 1a.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To ensure high quality (regarding breaking strength, geometric precision, roughness and avoidance of re-machining requirements) of the surface of the separated part along which separation occurs, the individual focal lines positioned on the substrate surface along the line of separation should be generated using the optical assembly described below (hereinafter, the optical assembly is alternatively also referred to as laser optics). The roughness of the separated surface (or cut edge) is determined primarily by the spot size or the spot diameter of the focal line. Roughness of a surface can be characterized, for example, by an Ra surface roughness parameter defined by the ASME B46.1 standard. As described in ASME B46.1, Ra is the arithmetic average of the absolute values of the surface profile height deviations from the mean line, recorded within the evaluation length. In alternative terms, Ra is the average of a set of absolute height deviations of individual features (peaks and valleys) of the surface relative to the mean.

In order to achieve a small spot size of, for example, 0.5 micron to 2 microns in case of a given wavelength $\lambda$, of laser 3 (interaction with the material of substrate 1), certain requirements must usually be imposed on the numerical aperture of laser optics 6. These requirements are met by laser optics 6 described below.

In order to achieve the required numerical aperture, the optics must, on the one hand, dispose of the required opening for a given focal length, according to the known Abbé formulae (N.A.=n sin (theta), n: refractive index of the glass or composite workpiece to be processed, theta: half the aperture angle; and theta=arctan ($D_L/2f$); $D_L$: aperture diameter, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is perpendicularly incident to the substrate plane, i.e. incidence angle θ is 0° so that the focal line 2b or the section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

As illustrated in FIG. 3A, the laser beam focal line 2b is not only a single focal point for the laser beam, but rather a series of focal points for different rays in the laser beam. The series of focal points form an elongated focal line of a defined length, shown in FIG. 3A as the length l of the laser beam focal line 2b.

Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to $1/e^2$ of the peak intensity) and approximately 75% of the diameter of the lens 7 of the optical assembly 6. The focal line 2b of a non-aberration-corrected spherical lens 7 generated by blocking out the beam bundles in the center is thus used. FIG. 3A shows the section in one plane through the central beam, and the complete three-dimensional bundle can be seen when the depicted beams are rotated around the focal line 2b.

One potential disadvantage of this type of a focal line formed by lens 7 and the system shown in FIG. 3A is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the substrate material in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 1, 3B:
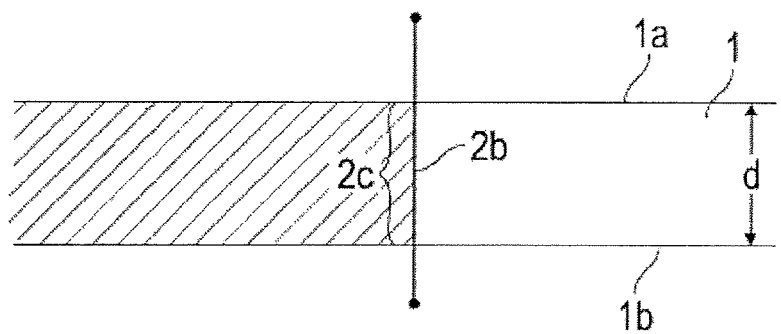
Figures 2, 3B:
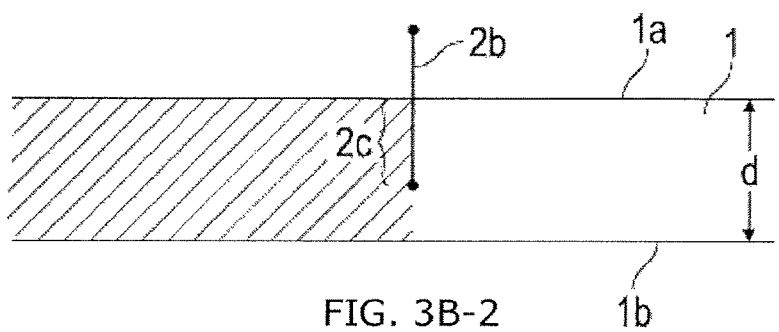
Figures 3, 3B:
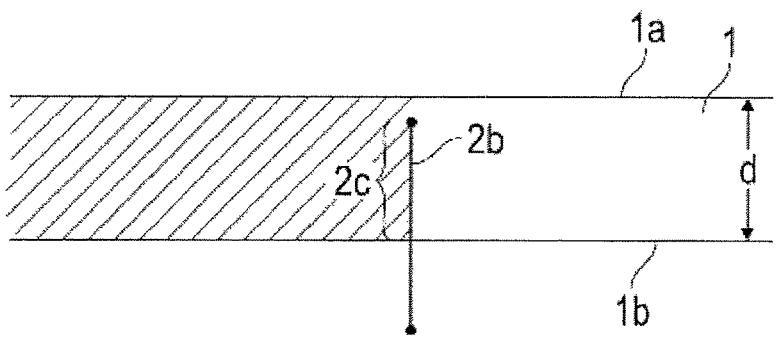
Figures 3, 3B, 4:
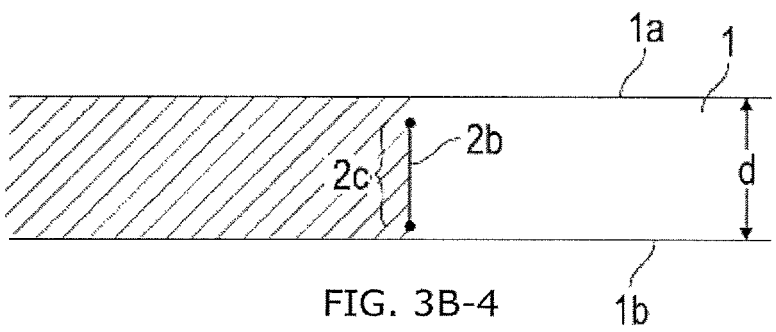

FIGS. 3B-1-4 show (not only for the optical assembly in FIG. 3A, but also for any other applicable optical assembly 6) that the position of laser beam focal line 2b can be controlled by suitably positioning and/or aligning the optical assembly 6 relative to substrate 1 as well as by suitably selecting the parameters of the optical assembly 6. As FIG. 3B-1 illustrates, the length l of the focal line 2b can be adjusted in such a way that it exceeds the substrate thickness d (here by factor 2). If substrate 1 is placed (viewed in longitudinal beam direction) centrally to focal line 2b, the section of induced absorption 2c is generated over the entire substrate thickness. The laser beam focal line 2b can have a length l in a range of between about 0.01 mm and about 100 mm or in a range of between about 0.1 mm and about 10 mm, or in a range of between about 0.1 mm and about 1 mm, for example. Various embodiments can be configured to have length l of about 0.1 mm, 0.2 mm, 0.3 mm, 0.4 mm, 0.5 mm, 0.7 mm, 1 mm, 2 mm, 3 mm or 5 mm, for example.

In the case shown in FIG. 3B-2, a focal line 2b of length l is generated which corresponds more or less to the substrate thickness d. Since substrate 1 is positioned relative to line 2b in such a way that line 2b starts at a point outside the substrate, the length L of the section of induced absorption 2c (which extends here from the substrate surface to a defined substrate depth, but not to the reverse surface 1b) is smaller than the length l of focal line 2b. FIG. 3B-3 shows the case in which the substrate 1 (viewed along a direction perpendicular to the beam direction) is positioned above the starting point of focal line 2b so that, as in FIG. 3B-2, the length l of line 2b is greater than the length L of the section of induced absorption 2c in substrate 1. The focal line thus starts within the substrate and extends beyond the reverse (remote) surface 1b. FIG. 3B-4 shows the case in which the focal line length l is smaller than the substrate thickness d so that—in the case of a central positioning of the substrate relative to the focal line viewed in the direction of incidence—the focal line starts near the surface 1a within the substrate and ends near the surface 1b within the substrate (e.g. l=0.75·d).

It is particularly advantageous to position the focal line 2b in such a way that at least one of surfaces 1a, 1b is covered by the focal line, so that the section of induced absorption 2c starts at least on one surface of the substrate. In this way it is possible to achieve virtually ideal cuts while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is generally known to one skilled in the art; the cone angle in the example is 10°. The apex of the axicon labeled here with reference 9 is directed towards the incidence direction and centered on the beam center. Since the focal line 2b produced by the axicon 9 starts within its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon while remaining within the range of focal line 2b. The section of the induced absorption 2c in the material of substrate 1 therefore extends over the entire substrate depth d.

However, the depicted layout is subject to the following restrictions: Since the region of focal line 2b formed by axicon 9 begins within axicon 9, a significant part of the laser energy is not focused into the section of induced absorption 2c of focal line 2b, which is located within the material, in the situation where there is a separation between axicon 9 and the substrate or glass composite workpiece material. Furthermore, length l of focal line 2b is related to the beam diameter through the refractive indices and cone angles of axicon 9. This is why, in the case of relatively thin materials (several millimeters), the total focal line is much longer than the substrate or glass composite workpiece thickness, having the effect that much of the laser energy is not focused into the material.

Figure 5A:
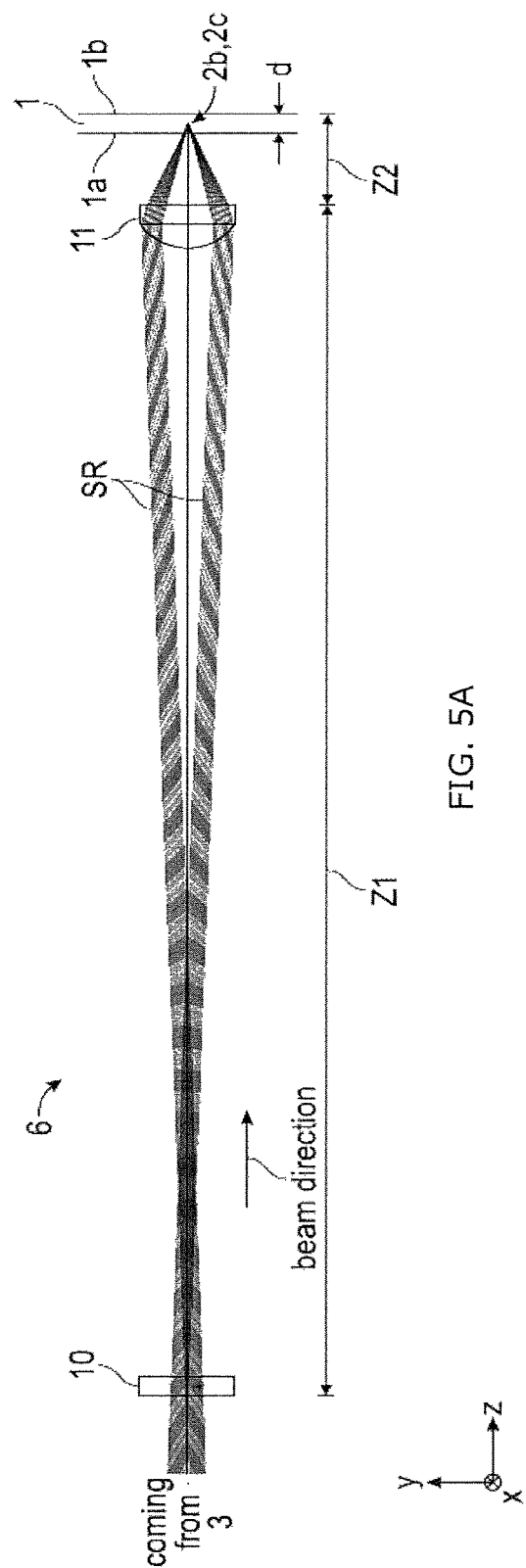
FIGS. 5A and 5B are illustrations of a third embodiment of an optical assembly for laser processing.

For this reason, it may be desirable to use an optical assembly 6 that includes both an axicon and a focusing lens. FIG. 5A depicts such an optical assembly 6 in which a first optical element with a non-spherical free surface designed to form laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance Z1 from the axicon 10. The distance Z1, in this case approximately 300 mm, is selected in such a way that the laser radiation formed by axicon 10 is circularly incident on the outer radial portion of lens 11. Lens 11 focuses the circular radiation on the output side at a distance Z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

Figure 5B:
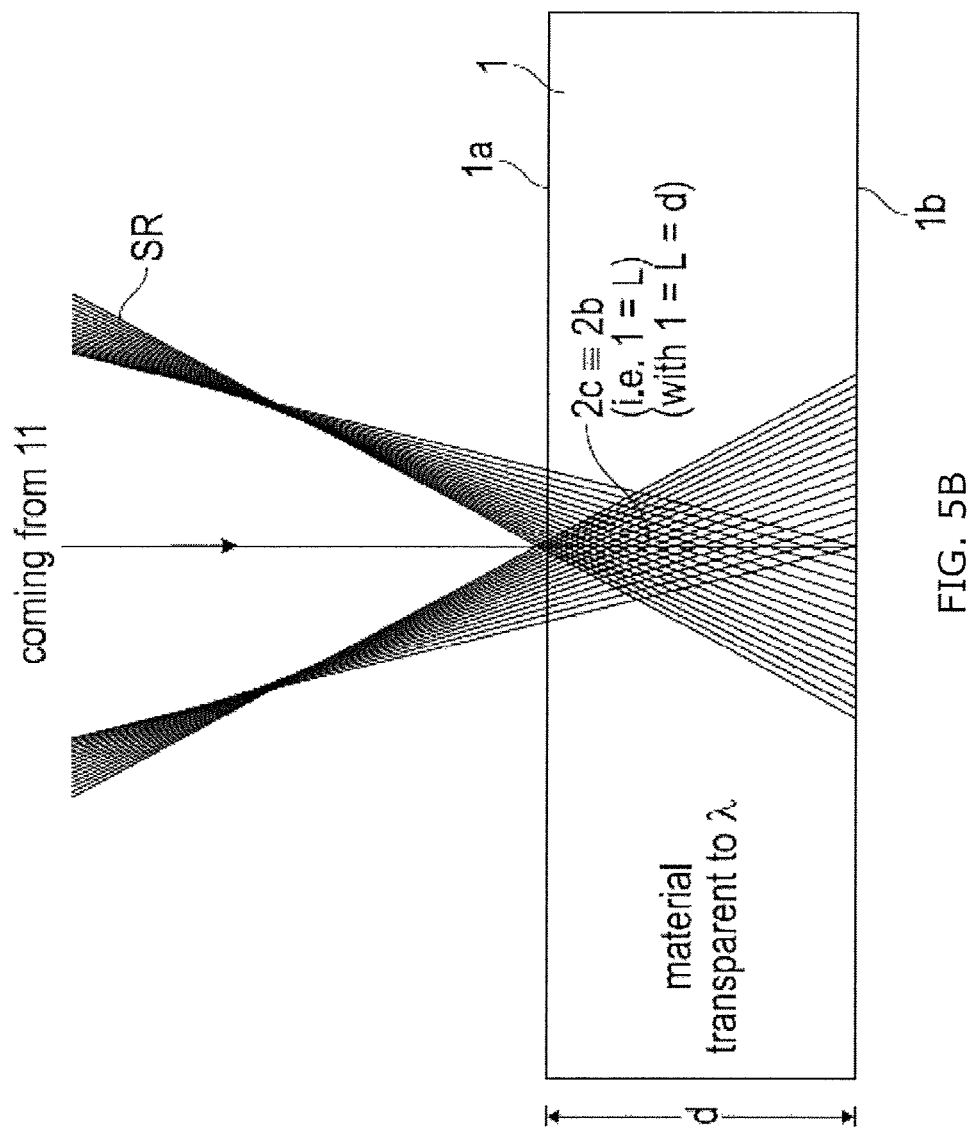

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the length l of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the required focal line 2b over a very short distance in the center of the spot, as a basically circular spot is formed. In this way, the defect line formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance Z1 (axicon-lens separation) and via the cone angle of the axicon. In this way, the entire laser energy can be concentrated in the focal line.

If the defect line formation is intended to continue to the back side of the substrate, the circular (annular) illumination still has the advantage that (1) the laser power is used optimally in the sense that most of the laser light remains concentrated in the required length of the focal line and (2) it is possible to achieve a uniform spot size along the focal line—and thus a uniform separation of part from substrate along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 6:
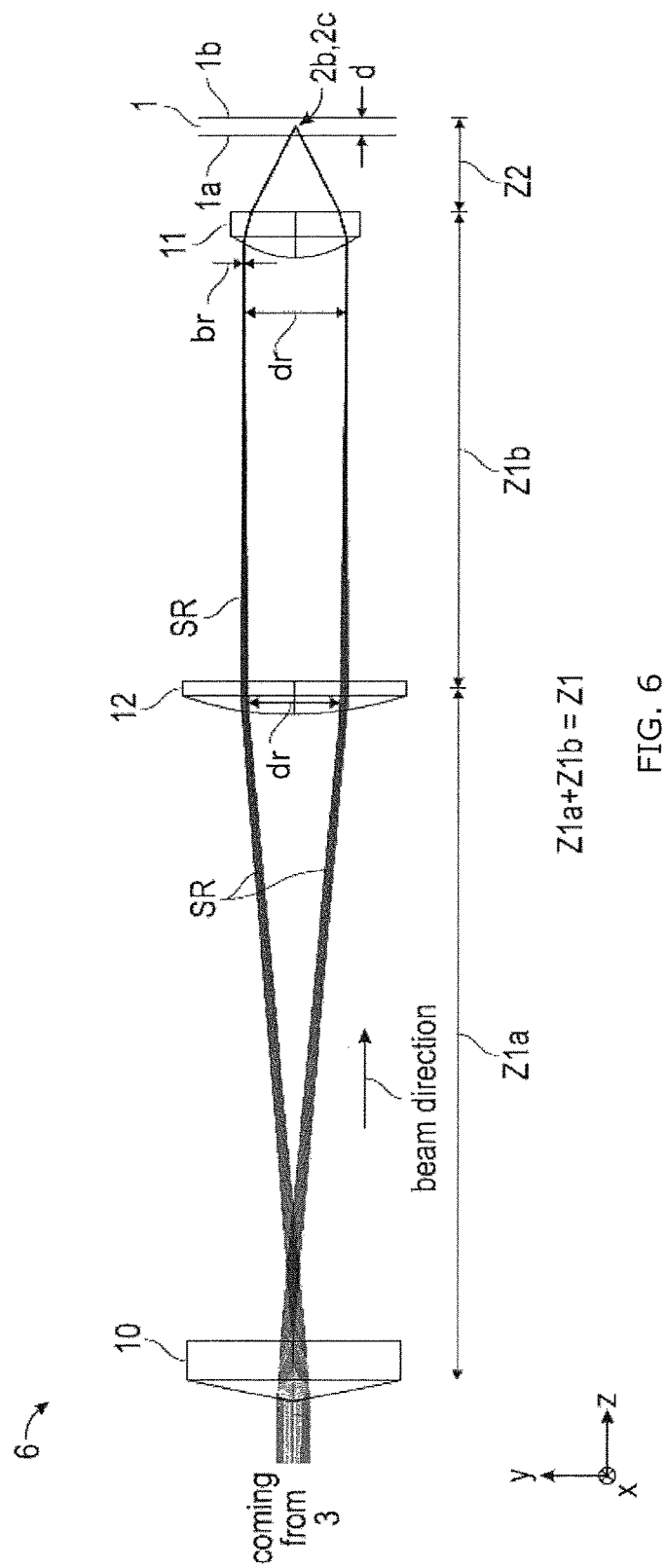
FIG. 6 is a schematic illustration of a fourth embodiment of an optical assembly for laser processing.

As shown in FIG. 6, both effects can be avoided by including another lens, a collimating lens 12, in the optical assembly 6. The additional positive lens 12 serves to adjust the circular illumination of focusing lens 11 very tightly. The focal length f' of collimating lens 12 is selected in such a way that the desired circle diameter dr results from distance Z1a from the axicon to the collimating lens 12, which is equal to f'. The desired width br of the ring can be adjusted via the distance Z1b (collimating lens 12 to focusing lens 11). As a matter of pure geometry, the small width of the circular illumination leads to a short focal line. A minimum can be achieved at distance f'.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as Z1a, the distance of focusing lens 11 from collimating lens 12 as Z1b, and the distance of the focal line 2b from the focusing lens 11 as Z2 (always viewed in beam direction). As shown in FIG. 6, the circular radiation SR formed by axicon 10, which is incident divergently and under the circle diameter dr on the collimating lens 12, is adjusted to the required circle width br along the distance Z1b for an at least approximately constant circle diameter dr at the focusing lens 11. In the case shown, a very short focal line 2b is intended to be generated so that the circle width br of approximately 4 mm at lens 12 is reduced to approximately 0.5 mm at lens 11 due to the focusing properties of lens 12 (circle diameter dr is 22 mm in the example).

In the depicted example, it is possible to achieve a length of the focal line l of less than 0.5 mm using a typical laser beam diameter of 2 mm, a focusing lens 11 with a focal length f=25 mm, a collimating lens with a focal length f'=150 mm, and choosing distances $Z1a=Z1b=140$ mm and $Z2=15$ mm.

FIGS. 7A-7C illustrate the laser-matter interaction at different laser intensity regimes. In the first case, shown in FIG. 7A, the unfocused laser beam 710 goes through a transparent substrate 720 without introducing any modification to it. In this particular case, the nonlinear effect is not present because the laser energy density (or laser energy per unit area illuminated by the beam) is below the threshold necessary to induce nonlinear effects. The higher the energy density, the higher is the intensity of the electromagnetic field. Therefore, as shown in FIG. 7B when the laser beam is focused by spherical lens 730 to a smaller spot size, as shown in FIG. 7B, the illuminated area is reduced and the energy density increases, triggering the nonlinear effect that will modify the material to permit formation of a fault line only in the volume where that condition is satisfied. In this way, if the beam waist of the focused laser is positioned at the surface of the substrate, modification of the surface will occur. In contrast, if the beam waist of the focused laser is positioned below the surface of the substrate, nothing happens at the surface when the energy density is below the threshold of the nonlinear optical effect. But at the focus 740, positioned in the bulk of the substrate 720, the laser intensity is high enough to trigger multi-photon non-linear effects, thus inducing damage to the material. Finally, as shown in FIG. 7C in the case of an axicon, as shown in FIG. 7C, the diffraction pattern of an axicon lens 750, or alternatively a Fresnel axicon, creates interference that generates a Bessel-shaped intensity distribution (cylinder of high intensity 760) and only in that volume is the intensity high enough to create nonlinear absorption and modification to the material 720. The diameter of cylinder 760, in which Bessel-shaped intensity distribution is high enough to create nonlinear absorption and modification to the material, is also the spot diameter of the laser beam focal line, as referred to herein. Spot diameter D of a Bessel beam can be expressed as $D=(2.4048\lambda)/(2\lambda B)$, where $\lambda$ is the laser beam wavelength and B is a function of the axicon angle.

Laser and Optical System:

For the purpose of cutting fusion formed glass composite workpieces, a process was developed that uses a 1064 nm picosecond laser in combination with line-focus beam forming optics to create lines of defect lines in the glass composite. A glass composite with up to 0.7 mm thickness was positioned so that it was within the region of the focal line produced by the optics. With a focal line about 1 mm in length, and a picosecond laser that produces output power of about 24 W or more at a repetition rate of 200 kHz (about 120 μJ/pulse in pulse mode or about 120 μJ/burst in burst mode) measured at the glass composite workpiece, the optical intensities in the focal line region can easily be high enough to create non-linear absorption in the glass composite workpiece. The pulsed laser beam can have an average laser energy measured, at the composite material, greater than 40 μJ per mm thickness of material. This "average laser energy" can also be referred to as an average, per-pulse, linear energy density, or an average energy per laser pulse per mm thickness of material. A region of damaged, ablated, vaporized, or otherwise modified material within the glass workpiece was created that approximately followed the linear region of high intensity.

The ultrashort (pulse durations on the order tens of picoseconds or shorter) laser can be operated in pulse mode or burst mode. In pulse mode, a series of nominally identical single pulses is emitted from the laser and directed to the substrate. In pulse mode, the repetition rate of the laser is determined by the spacing in time between the pulses. In burst mode, bursts of pulses are emitted from the laser, where each burst includes two or more pulses (of equal or different amplitude). In burst mode, pulses within a burst are separated by a first time interval (which defines a pulse repetition rate for the burst) and the bursts are separated by a second time interval (which defines a burst repetition rate), where the second time interval is typically much longer than the first time interval. As used herein (whether in the context of pulse mode or burst mode), time interval refers to the time difference between corresponding parts of a pulse or burst (e.g. leading edge-to-leading edge, peak-to-peak, or trailing edge-to-trailing edge). Pulse and burst repetition rates are controlled by the design of the laser and can typically be adjusted, within limits, by adjusting operating conditions of the laser. Typical pulse and burst repetition rates are in the kHz to MHz range. The laser pulse duration (in pulse mode or for pulses within a burst in burst mode) may be $10^{-10}$ s or less, or $10^{-11}$ s or less, or $10^{-12}$ s or less, or $10^{-13}$ s or less. In the exemplary embodiments described herein, the laser pulse duration is greater than $10^{-15}$.

Figure 8A:
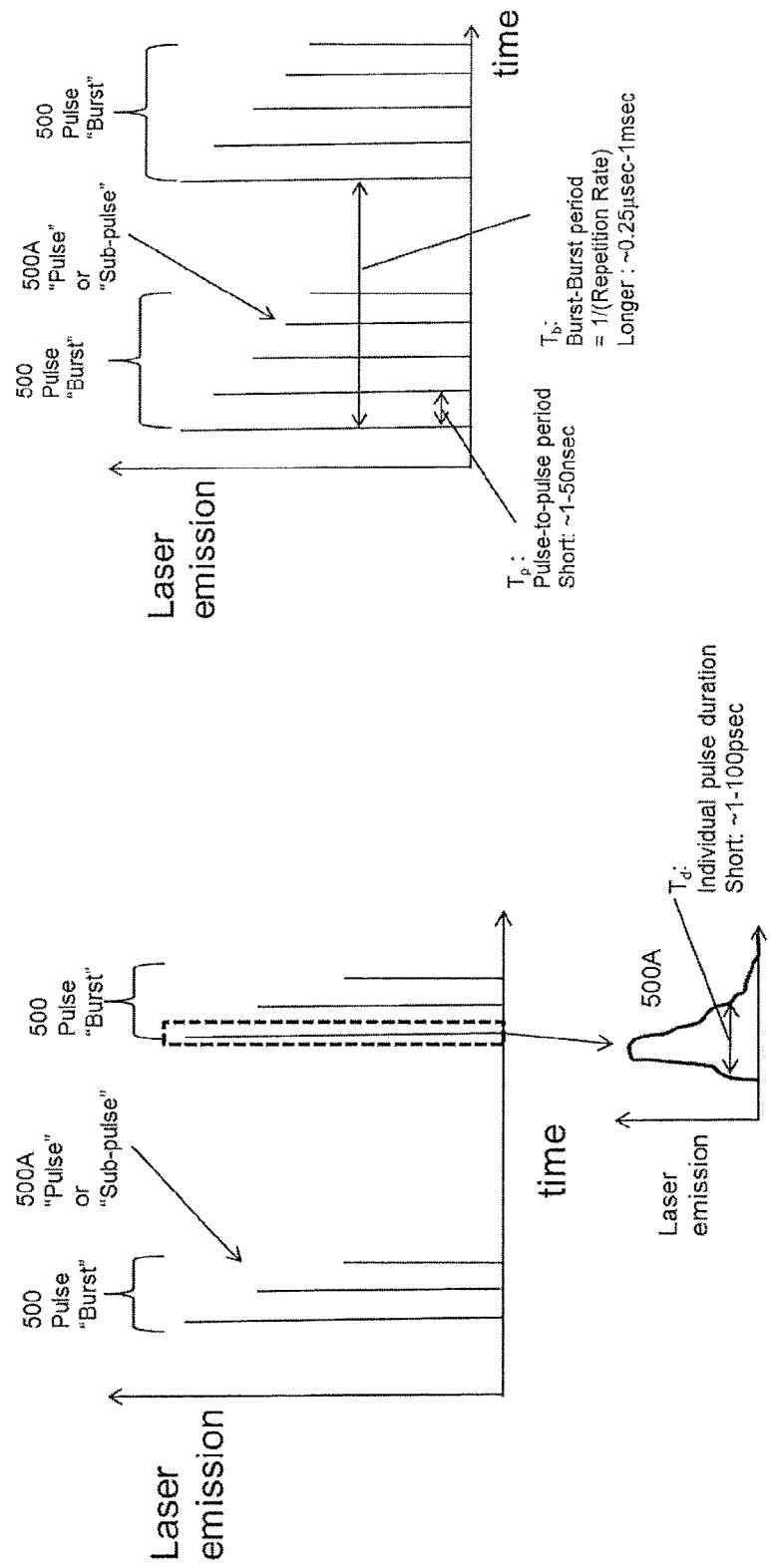
FIG. 8A depicts laser emission as a function of time for a picosecond laser. Each emission is characterized by a pulse "burst" which may contain one or more sub-pulses. Times corresponding to pulse duration, separation between pulses, and separation between bursts are illustrated.
Figure 8:
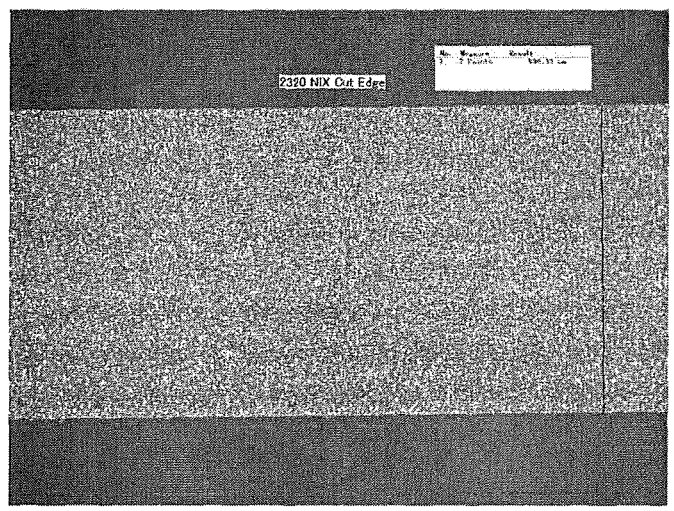
FIG. 8B is an edge image of a straight cut strip of 0.7 mm thick Corning 2320 NIOX (not ion exchanged) thick substrate.

More specifically, as illustrated in FIG. 8A, according to selected embodiments described herein, the picosecond laser creates a "burst" 500 of pulses 500A, sometimes also called a "burst pulse". Bursting is a type of laser operation where the emission of pulses is not in a uniform and steady stream but rather in tight clusters of pulses. Each "burst" 500 may contain multiple pulses 500A (such as 2 pulses, 3 pulses, 4 pulses, 5 pulses, 10, 15, 20, or more) of very short duration $T_d$ up to 100 psec (for example, 0.1 psec, 5 psec, 10 psec, 15 psec, 18 psec, 20 psec, 22 psec, 25 psec, 30 psec, 50 psec, 75 psec, or therebetween). The pulse duration is generally in a range from about 1 psec to about 1000 psec, or in a range from about 1 psec to about 100 psec, or in a range from about 2 psec to about 50 psec, or in a range from about 5 psec to about 20 psec. These individual pulses 500A within a single burst 500 can also be termed "sub-pulses," which simply denotes the fact that they occur within a single burst of pulses. The energy or intensity of each laser pulse 500A within the burst may not be equal to that of other pulses within the burst, and the intensity distribution of the multiple pulses within a burst 500 may follow an exponential decay in time governed by the laser design. Preferably, each pulse 500A within the burst 500 of the exemplary embodiments described herein are separated in time from the subsequent pulse in the burst by a duration $T_p$ from 1 nsec to 50 nsec (e.g. 10-50 nsec, or 10-40 nsec, or 10-30 nsec, with the time often governed by the laser cavity design. For a given laser, the time separation $T_p$ between each pulses (pulse-to-pulse separation) within a burst 500 is relatively uniform (±10%). For example, in some embodiments, each pulse is separated in time from the subsequent pulse by approximately 20 nsec (50 MHz pulse repetition frequency). For example, for a laser that produces pulse-to-pulse separation $T_p$ of about 20 nsec, the pulse-to-pulse separation $T_p$ within a burst is maintained within about ±10%, or is about ±2 nsec. The time between each "burst" (i.e., time separation $T_b$ between bursts) will be much longer (e.g., $0.25 \leq T_b \leq 1000$ microseconds, for example 1-10 microseconds, or 3-8 microseconds.) For example in some of the exemplary embodiments of the laser described herein it is around 5 microseconds for a laser repetition rate or frequency of about 200 kHz. The laser repetition rate is also referred to as burst repetition frequency or burst repetition rate herein, and is defined as the time between the first pulse in a burst to the first pulse in the subsequent burst. In other embodiments, the burst repetition frequency is in a range of between about 1 kHz and about 4 MHz, or in a range between about 1 kHz and about 2 MHz, or in a range of between about 1 kHz and about 650 kHz, or in a range of between about 10 kHz and about 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 kHz burst repetition rate). The exact timings, pulse durations, and repetition rates can vary depending on the laser design and user-controllable operating parameters. Short pulses ($T_d$<20 psec and preferably $T_d \leq 15$ psec) of high intensity have been shown to work well.

The required energy to modify the material can be described in terms of the burst energy—the energy contained within a burst (each burst 500 contains a series of pulses 500A), or in terms of the energy contained within a single laser pulse (many of which may comprise a burst). For these applications, the energy per burst (per millimeter of the material to be cut) can be from 10-2500 µJ, or from 20-1500 µJ, or from 25-750 µJ, or from 40-2500 µJ, or from 100-1500 µJ, or from 200-1250 µJ, or from 250-1500 µJ, or from 250-750 µJ. The energy of an individual pulse within the burst will be less, and the exact individual laser pulse energy will depend on the number of pulses 500A within the burst 500 and the rate of decay (e.g., exponential decay rate) of the laser pulses with time as shown in FIG. 8A. For example, for a constant energy/burst, if a pulse burst contains 10 individual laser pulses 500A, then each individual laser pulse 500A will contain less energy than if the same burst pulse 500 had only 2 individual laser pulses.

The use of lasers capable of generating such pulse bursts is advantageous for cutting or modifying transparent materials, for example glass. In contrast with the use of single pulses spaced apart in time by the repetition rate of a single-pulsed laser, the use of a burst pulse sequence that spreads the laser energy over a rapid sequence of pulses within burst 500 allows access to larger timescales of high intensity interaction with the material than is possible with single-pulse lasers. While a single-pulse can be expanded in time, conservation of energy dictates that as this is done, the intensity within the pulse must drop as roughly one over the pulse width. Hence if a 10 psec single pulse is expanded to a 10 nsec pulse, the intensity drops by roughly three orders of magnitude. Such a reduction can reduce the optical intensity to the point where non-linear absorption is no longer significant and the light-material interaction is no longer strong enough to allow for cutting. In contrast, with a burst pulse laser, the intensity during each pulse or sub-pulse 500A within the burst 500 can remain very high—for example three pulses 500A with pulse duration $T_d$ 10 psec that are spaced apart in time by a separation $T_p$ of approximately 10 nsec still allows the intensity within each pulse to be approximately three times higher than that of a single 10 psec pulse, while the laser is allowed to interact with the material over a timescale that is three orders of magnitude larger. This adjustment of multiple pulses 500A within a burst thus allows manipulation of timescale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of defect lines (perforations). The amount of burst energy required to modify the material will depend on the substrate material composition and the length of the line focus used to interact with the substrate. The longer the interaction region, the more the energy is spread out, and the higher the burst energy that will be required.)

A defect line or a hole is formed in the material when a single burst of pulses strikes essentially the same location on the glass. That is, multiple laser pulses within a single burst can produce a single defect line or a hole location in the glass. Of course, if the glass is translated (for example by a constantly moving stage) or the beam is moved relative to the glass, the individual pulses within the burst cannot be at exactly the same spatial location on the glass. However, they are well within 1 µm of one another—i.e., they strike the glass at essentially the same location. For example, they may strike the glass at a spacing sp where 0<sp≤500 nm from one another. For example, when a glass location is hit with a burst of 20 pulses the individual pulses within the burst strike the glass within 250 nm of each other. Thus, in some embodiments 1 nm<sp<250 nm. In some embodiments 1 nm<sp<100 nm.

Hole or Damage Track Formation:

If the substrate has sufficient stress (e.g. with ion exchanged glass), then the part will spontaneously separate along the path of perforated damage (fault line) traced out by the laser process. However, if there is not a lot of stress inherent to the substrate, then the picosecond laser will simply form defect lines (damage tracks) in the composite workpiece. These defect lines generally take the form of holes with interior dimensions (diameters) 0.5-1.5 microns.

Figure 9:
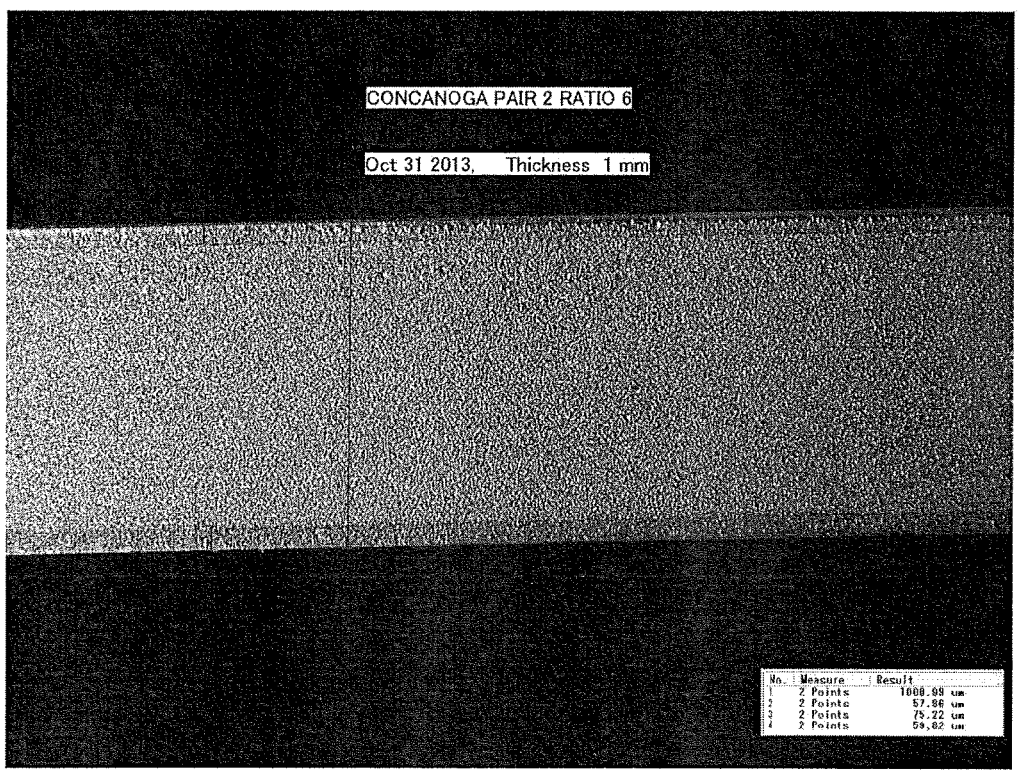
FIG. 9 is an edge image of a fusion formed glass composite cut according to this disclosure.

The defect lines may or may not perforate the entire thickness of the material, and may or may not be a continuous opening throughout the depth of the material. FIG. 8B shows an example of defect lines perforating the entire thickness of a workpiece of 700 micron thick 2320 NIOX substrate. Similar effect is seen on fusion formed glass compositions as shown in FIG. 9. The defect lines are observed through the side of a cleaved edge. The defect lines through the material are not necessarily through holes. There may be regions of glass that plug the holes, but they are generally small in size, on the order of microns, for example. Note that upon separation of the part, fracture occurs along the defect lines to provide a part having a perimeter surface (edge) with features derived from the defect lines. Before separation, the defect lines are generally cylindrical in shape. Upon separation of the part, the defect lines fracture and remnants of the defect lines are evident in the contours of the perimeter surface of the separated part. In an ideal model, the defect lines are cleaved in half upon separation so that the perimeter surface of the separated part includes serrations corresponding to half-cylinders. In practice, separation may deviate from an ideal model and the serrations of the perimeter surface may be an arbitrary fraction of the shape of the original defect line. Irrespective of the particular form, features of the perimeter surface will be referred to as defect lines to indicate the origin of their existence.

It is also possible to perforate workpieces comprising stacked sheets of glass. In this case, the defect line length needs to be longer than the stack height.

The lateral spacing (pitch) between the holes (defect lines, perforations) is determined by the pulse rate of the laser as the substrate is translated underneath the focused laser beam. Only a single picosecond laser pulse or burst is usually necessary to form an entire hole, but multiple pulses or bursts may be used if desired. To form holes at different pitches, the laser can be triggered to fire at longer or shorter intervals. For cutting operations, the laser triggering generally is synchronized with the stage driven motion of the workpiece beneath the beam, so laser pulses are triggered at a fixed interval, such as every 1 micron, or every 5 microns. Distance, or periodicity, between adjacent defect lines along the direction of the fault line can be greater than 0.1 micron and less than or equal to about 20 microns in some embodiments, for example. More preferably, the spacing is between 0.5 micron and 3.0 microns. Even more preferably, the spacing can be between 0.5 micron and 1.0 micron. The exact spacing between adjacent defect lines is determined by the material properties that facilitate crack propagation from perforated hole to perforated hole, given the stress level in the substrate. However, in contrast to cutting a substrate, it is also possible to use the same method to only perforate the material. In the methods described herein, the holes or defect lines can be separated by larger spacings (e.g., a 7 micron pitch or greater).

The laser power and lens focal length (which determines the focal line length and hence power density) are particularly important parameters to ensure full penetration of the glass and low surface and sub-surface damage.

In general, the higher the available laser power, the faster the material can be cut with the above process. The process(s) disclosed herein can cut glass at a cutting speed of 0.25 m/sec, or faster. A cut speed (or cutting speed) is the rate the laser beam moves relative to the surface of the substrate material (e.g., glass) while creating multiple defect lines holes. High cut speeds, such as, for example 400 mm/sec, 500 mm/sec, 750 mm/sec, 1 m/sec, 1.2 m/sec, 1.5 m/sec, or 2 m/sec, or even 3.4 m/sec to 4 m/sec are often desired in order to minimize capital investment for manufacturing, and to optimize equipment utilization rate. The laser power is equal to the burst energy multiplied by the burst repetition frequency (rate) of the laser. In general, to cut glass materials at high cutting speeds, the defect lines are typically spaced apart by 1-25 µm, in some embodiments the spacing is preferably 3 µm or larger—for example 3-12 µm, or for example 5-10 µm.

For example, to achieve a linear cutting speed of 300 mm/sec, 3 µm hole pitch corresponds to a pulse burst laser with at least 100 kHz burst repetition rate. For a 600 mm/sec cutting speed, a 3 µm pitch corresponds to a burst-pulsed laser with at least 200 kHz burst repetition rate. A pulse burst laser that produces at least 40 µJ/burst at 200 kHz, and cuts at a 600 mm/s cutting speed needs to have a laser power of at least 8 Watts. Higher cut speeds require accordingly higher laser powers.

For example, a 0.4 m/sec cut speed at 3 µm pitch and 40 µJ/burst would require at least a 5 W laser, a 0.5 m/sec cut speed at 3 µm pitch and 40 µJ/burst would require at least a 6 W laser. Thus, preferably the laser power of the pulse burst ps laser is 6 W or higher, more preferably at least 8 W or higher, and even more preferably at least 10 W or higher. For example, in order to achieve a 0.4 msec cut speed at 4 µm pitch (defect line spacing, or damage tracks spacing) and 100 µJ/burst, one would require at least a 10 W laser, and to achieve a 0.5 msec cut speed at 4 µm pitch and 100 µJ/burst, one would require at least a 12 W laser. For example, to achieve a cut speed of 1 m/sec at 3 µm pitch and 40 µJ/burst, one would require at least a 13 W laser. Also, for example, 1 m/sec cut speed at 4 µm pitch and 400 µJ/burst would require at least a 100 W laser.

The optimal pitch between defect lines (damage tracks) and the exact burst energy is material dependent and can be determined empirically. However, it should be noted that raising the laser pulse energy or making the damage tracks at a closer pitch are not conditions that always make the substrate material separate better or with improved edge quality. A pitch that is too small (for example <0.1 micron, or in some exemplary embodiments <1 µm, or in other embodiments <2 µm) between defect lines (damage tracks) can sometimes inhibit the formation of nearby subsequent defect lines (damage tracks), and often can inhibit the separation of the material around the perforated contour. An increase in unwanted micro cracking within the glass may also result if the pitch is too small. A pitch that is too long (e.g. >50 µm, and in some glasses >25 µm or even >20 µm) may result in "uncontrolled microcracking"—i.e., where instead of propagating from defect line to defect line along the intended contour, the microcracks propagate along a different path, and cause the glass to crack in a different (undesirable) direction away from the intended contour. This may ultimately lower the strength of the separated part since the residual microcracks constitute flaws that weaken the glass. A burst energy for forming defect lines that is too high (e.g., >2500 µJ/burst, and in some embodiments >500 µJ/burst) can cause "healing" or re-melting of previously formed defect lines, which may inhibit separation of the glass. Accordingly, it is preferred that the burst energy be <2500 µJ/burst, for example, ≤500 µJ/burst. Also, using a burst energy that is too high can cause formation of microcracks that are extremely large and create structural imperfections that can reduce the edge strength of the part after separation. A burst energy that is too low (e.g. <40 µJ/burst) may result in no appreciable formation of defect lines within the glass, and hence may necessitate especially high separation force or result in a complete inability to separate along the perforated contour.

Typical exemplary cutting rates (speeds) enabled by this process are, for example, 0.25 msec and higher. In some embodiments, the cutting rates are at least 300 mm/sec. In some embodiments, the cutting rates are at least 400 mm/sec, for example, 500 mm/sec to 2000 mm/sec, or higher. In some embodiments the picosecond (ps) laser utilizes pulse bursts to produce defect lines with periodicity between 0.5 µm and 13 µm, e.g. between 0.5 and 3 µm. In some embodiments, the pulsed laser has laser power of 10 W-100 W and the material and/or the laser beam are translated relative to one another at a rate of at least 0.25 msec; for example, at the rate of 0.25 msec to 0.35 msec, or 0.4 msec to 5 msec. Preferably, each pulse burst of the pulsed laser beam has an average laser energy measured at the workpiece greater than 40 µJ per burst per mm thickness of workpiece. Preferably, each pulse burst of the pulsed laser beam has an average laser energy measured at the workpiece greater of less than 2500 µJ per burst per mm thickness of workpiece, and preferably lass than about 2000 µJ per burst per mm thickness of workpiece, and in some embodiments less than 1500 µJ per burst per mm thickness of workpiece; for example, not more than 500 µJ per burst per mm thickness of workpiece.

We discovered that much higher (5 to 10 times higher) volumetric pulse energy density (µJ/µm$^3$) is required for perforating alkaline earth boroaluminosilicate glasses with low or no alkali content. This can be achieved, for example, by utilizing pulse burst lasers, preferably with at least 2 pulses per burst and providing volumetric energy densities within the alkaline earth boroaluminosilicate glasses (with low or no alkali) of about 0.050 µJ/µm$^3$ or higher, e.g., at least 0.1 µJ/m$^3$, for example 0.1-0.5 µJ/µm$^3$.

Accordingly, it is preferable that the laser produces pulse bursts with at least 2 pulses per burst. For example, in some embodiments the pulsed laser has a power of 10 W-150 W (e.g., 10 W-100 W) and produces pulse bursts with at least 2 pulses per burst (e.g., 2-25 pulses per burst). In some embodiments the pulsed laser has a power of 25 W-60 W, and produces pulse bursts with at least 2-25 pulses per burst, and periodicity or distance between the adjacent defect lines produced by the laser bursts is 2-10 µm. In some embodiments, the pulsed laser has a power of 10 W-100 W, produces pulse bursts with at least 2 pulses per burst, and the workpiece and the laser beam are translated relative to one another at a rate of at least 0.25 msec. In some embodiments, the workpiece and/or the laser beam are translated relative to one another at a rate of at least 0.4 msec.

For example, for cutting 0.7 mm thick non-ion exchanged Corning code 2319 or code 2320 Gorilla® glass, it is observed that pitches of 3-7 µm can work well, with pulse burst energies of about 150-250 µJ/burst, and burst pulse numbers that range from 2-15, and preferably with pitches of 3-5 µm and burst pulse numbers (number of pulses per burst) of 2-5.

At 1 msec cut speeds, the cutting of Eagle XG® glass typically requires utilization of laser powers of 15-84 W, with 30-45 W often being sufficient. In general, across a variety of glass and other transparent materials, applicants discovered that laser powers between 10 W and 100 W are preferred to achieve cutting speeds from 0.2-1 msec, with laser powers of 25-60 W being sufficient (or optimum) for many glasses. For cutting speeds of 0.4 msec to 5 msec, laser powers should preferably be 10 W-150 W, with burst energy of 40-750 µJ/burst, 2-25 bursts per pulse (depending on the material that is cut), and defect line separation (pitch) of 3 to 15 µm, or 3-10 µm. The use of picosecond pulse burst lasers would be preferable for these cutting speeds because they generate high power and the required number of pulses per burst. Thus, according to some exemplary embodiments, the pulsed laser produces 10 W-100 W of power, for example 25 W to 60 W, and produces pulse bursts at least 2-25 pulses per burst and the distance between the defect lines is 2-15 µm; and the laser beam and/or workpiece are translated relative to one another at a rate of at least 0.25 msec, in some embodiments at least 0.4 msec, for example 0.5 msec to 5 msec, or faster.

Figure 10:
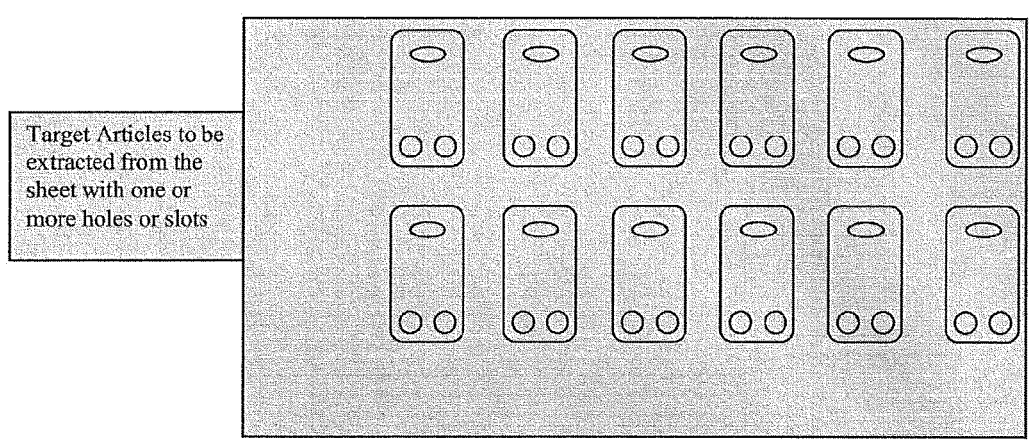
FIG. 10 is an illustration of a composite glass sheet with articles planned to be extracted.
Figure 11:
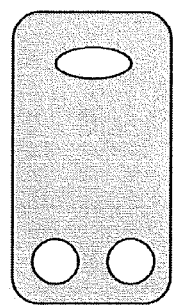
FIG. 11 is an illustration of a composite glass article with holes and slots separated.

Cutting and Separating Shapes of a Plate:

The creation of articles with or without holes or slots is highly desired, from larger composite glass sheets as shown in FIG. 10 is highly desired. FIG. 11 shows an exemplar separated composite article with the holes and slots for functional buttons or for speaker or microphones to be placed.

Fault lines were traced by the picosecond laser alone, or by a combination of a picosecond laser followed by a $CO_2$ laser, to release the perimeter and/or internal holes or slots. It is important to notice that the introduction of release lines and the path traced by the defocused $CO_2$ laser is carefully planned to avoid issues, such as:

Avoid coincident start/stop position. In general, the slow acceleration/deceleration of the moving stages can be enough to create a punctual stress source that will later crack or even shatter the part.

Stopping or "parking" the defocused $CO_2$ laser on any spot over the traced contour—most commonly this may melt the surface and/or create micro-cracks. The path of the $CO_2$ laser should be planned to start and finish outside the contour to be released.

Exemplary picosecond laser conditions were: 1064 nm wavelengths, 4 pulses per burst, power level 100%, 200 kHz repetition rate. Exemplary $CO_2$ laser conditions were: 10.6 micron wavelength, 2 passes of the laser at 20 m/min, focus at 28.5 mm, 100% power, 17 microsecond pulses at 20 kHz repetition rate.

Further processing of the extracted articles via acid etching can yield very high edge strength articles as compared to the as-laser-cut sheets. In some instances the as-cut sheets may be strong enough for particular application, while it is generally desired to have higher edge strength for many applications.

Figure 12:
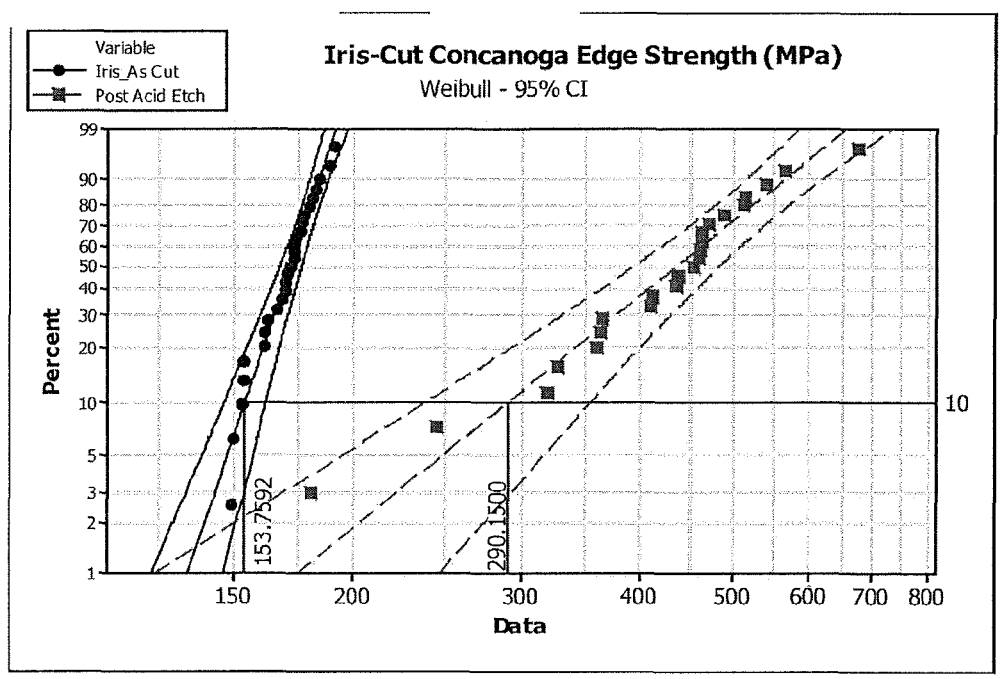
FIG. 12 is a graph of edge strength of fusion formed glass composite cut according to this disclosure, showing edge strength results before and after acid etching.

Parts (articles) were then subjected to a standard acid etch treatment (e.g., a solution of 1.5 M HF and 0.9 M $H_2SO_4$) to reduce or remove completely the surface defects induced by the laser cutting method. The edge strength data was then plotted in a Weibull plot shown in FIG. 12, in comparison to "as-cut" examples. As can be seen in FIG. 12, articles as treated can now achieve significantly higher strength values, as high as 650 megapascals (MPa).

Figures 13A, 13B, 13C:
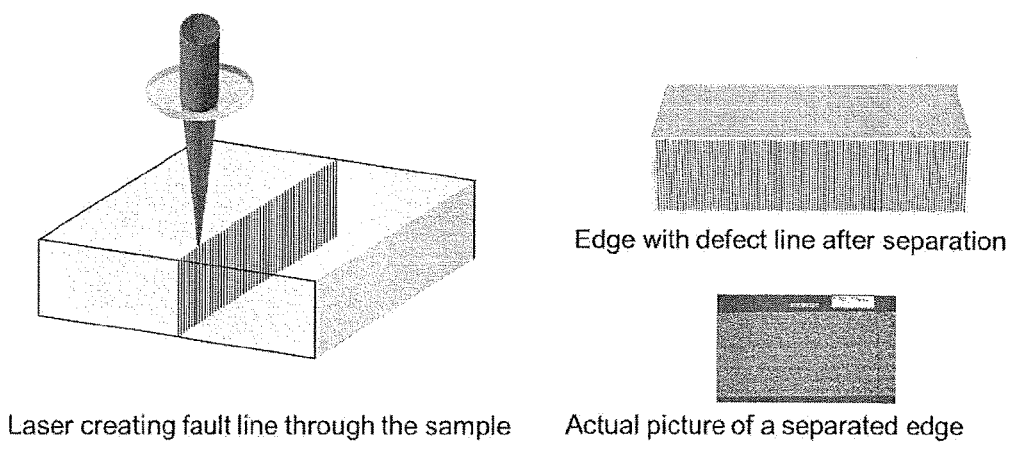
FIGS. 13A-13C are illustrations of a defect line with equally spaced columns of modified glass.

FIGS. 13A-13C show examples of defect lines with equally spaced columns of modified glass.

Cutting Glass On-the-Draw

Mechanical scoring and breaking is the traditional glass cutting approach for a continuous fusion glass manufacturing process. Although fast, achieving 1 m/s for straight cuts, this process is highly limited when it comes to cutting contour glass shapes as it becomes extremely challenging for such applications due to slow speed, glass edge chipping, high roughness of the cut edge, etc. These applications require multiple grinding and polishing steps in order to reduce subsurface damage (SSD), as well as washing steps, which not only add the cost to the process due to higher capital requirements and higher costs due to low yields, but are also simply not capable of meeting the technical requirements.

More recently, a carbon dioxide ($CO_2$) laser score and break approach has been developed for cutting display glass compositions. This technique relies on mechanical (or laser) crack initiation followed by a $CO_2$ laser crack propagation. Most often, a $CO_2$ laser radiation at the wavelength of 10.6 microns is used as a precision heat source followed by a coolant jet to create the thermal shock and propagate the crack along the straight line traversed by the $CO_2$ laser. The difficulties for this approach lie in its inability to successfully control and propagate such cracks, especially along contours. Although straight cutting by either a mechanical or a laser score and break techniques might work well for some applications, the ever increasing demands for highly precise, clean and flexible glass cutting solutions needed.

One example of the difficulties of mechanical and $CO_2$ scoring is the liquid crystal display (LCD) glass fusion process. In the LCD fusion process, a continuous ribbon of thin flat glass is formed, emanating from a high draw tower. This thin glass is formed between 0.050 mm and 2 mm thick and between 24" and 150" wide. This ribbon of glass is scored by a mechanical scoring wheel similar to scoring or cutting glass windows. This scored glass is then mechanically bent and broken of the ribbon to establish a sheet 24"-150" wide by 24"-150" tall at the bottom of the draw tower. This sheet has a very rough section on the right and left sides of the sheet. Mechanical scoring can only be performed in the quality area of the glass sheet, and not in the thicker beaded section of the glass sheet. Then a robot will grip the sheet of glass, bend it, and break the scored sheet from the ribbon of glass. This breaking action causes a high amplitude vibration up the ribbon into the draw tower which causes forming flatness variations in the final sheet. It also causes rubicons since the vibration will run a microcrack up the draw. Mechanically scoring and breaking glass produces glass chips that are very light like a leaf, but these glass chips are 10-200 microns in size and 3-20 microns thick. These glass chips float up the draw tower and attach to the surface of the sheet, and some of these particles, called clam shell glass chips, attach permanently to the ribbon glass surface, which results in a rejected section of glass.

This glass sheet is then moved from the ribbon area to a secondary cut area, where the glass sheet is placed on another machine called a vertical bead scoring machine, and the beaded section of the glass or non-quality area is then mechanically scored, and then the beaded section is mechanically broken off of the parent sheet. Again, tiny clam shell glass chips fly off the sheet onto the defect area, resulting in a rejected section of glass.

All the sheets are then packed in some cases into crates and shipped to a finishing location. Again, clam shell glass chips migrate from the edge of the glass to the surface and result in rejected sections of glass. This crate of glass is unloaded and placed in a finishing line, where the sheet is mechanically or $CO_2$ scored and mechanically broken into a slightly smaller sheet of glass, but this scoring process is much more precise than the precise score machines. Again, more clam shell glass chips fly onto the glass surface, resulting in rejected sections of these glass sheets.

The sheet is next moved to edge grinders that rough and fine grind the thin glass sheets to a final length and width. Then, the sheet is moved to another grinder that will grind the four corners. Next, the sheet moves to an inline washer that cleans the surface of most loose particles except the clam shell particles.

The laser glass cutting technology disclosed herein cuts glasses, including thin glass, extremely accurately, extremely fast and without creating glass chips. The technology can perforate glass with extremely small holes (e.g. <1 micron) and short pitch spacing (e.g., 1 micron). Also, the glass can be perforated at extremely high speeds (e.g. 1-2 meters/sec). In test cases, no chips have been observed on the edge of the glass. The laser process can perforate and separate small glass articles like a cell phone size (70 mm×150 mm) shape out of a larger sheet of glass. This perforating and separating process of thin glass leaves behind an edge with an Ra surface roughness less than 400 nm and sub-surface micro-cracks at depths limited to 60 microns or less. This edge quality is close to the quality of a ground sheet of glass. Given this capability, hot glass can be laser cut at the fusion draw process that makes thin glass sheet.

Figure 14:
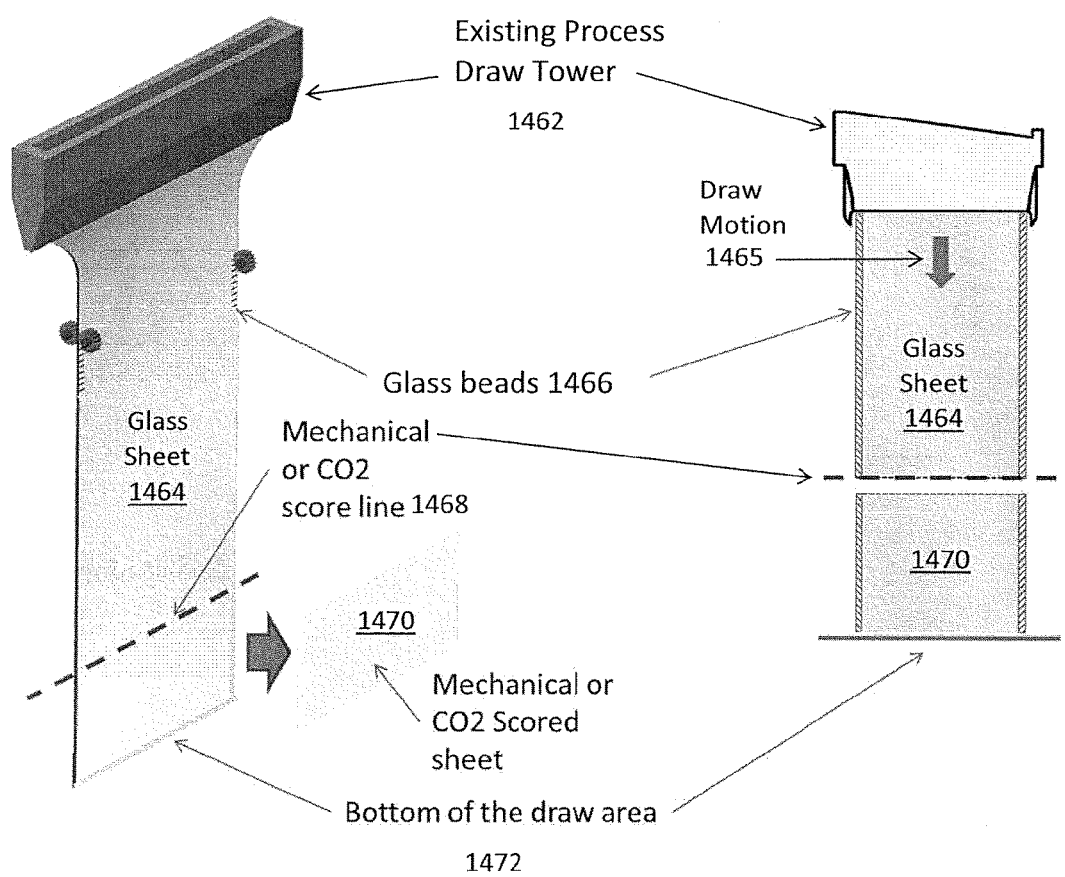
FIG. 14 illustrates an existing glass cutting approach for a continuous fusion glass manufacturing process using mechanical or $CO_2$ laser scoring.

FIG. 14 illustrates an existing glass cutting approach for a continuous fusion glass manufacturing process. In the existing process, a glass sheet 1464 flows down from a draw tower 1462. Darker shading of the glass sheet 1464 indicates higher temperature. When a sheet of glass is formed, for example on a fusion draw machine, the hot and soft glass sheet is pulled by a grasping mechanism such as rollers that form imprints on the two outer edges of the glass sheet. The imprinted edges are called "beads", and these edges extend the entire length of the glass sheet. Since these beaded areas are often distorted and non-flat compared to the central section of the glass sheet, removal of the beads (or beaded area) is done before the glass is utilized in making final devices. As illustrated by draw motion 1465, the glass sheet is drawn down using roller wheels that create glass beads 1466 along the edge of the glass sheet 1464. A mechanical or $CO_2$ laser score is applied along a score line 1468, facilitating breaking of a scored sheet 1470 from the glass sheet 1464.

The methods described herein offer a glass cutting solution for display glass compositions for both online and off-line glass cutting needs. Online, these methods can be applied for both cutting and bead removal of the glass sheet as it comes from the draw, particularly at the area known as the Bottom of the Draw (BOD), where glass starts cooling down from its forming temperature. The methods described herein provide a glass cutting solution that can provide a full-body (full-thickness) perforation through the whole thickness of the glass sheet. A series of full-thickness perforations can form a fault line that, upon sheet separation along the fault line, can form a very precise and controllable cut in the glass sheet.

Figures 15A, 15B:
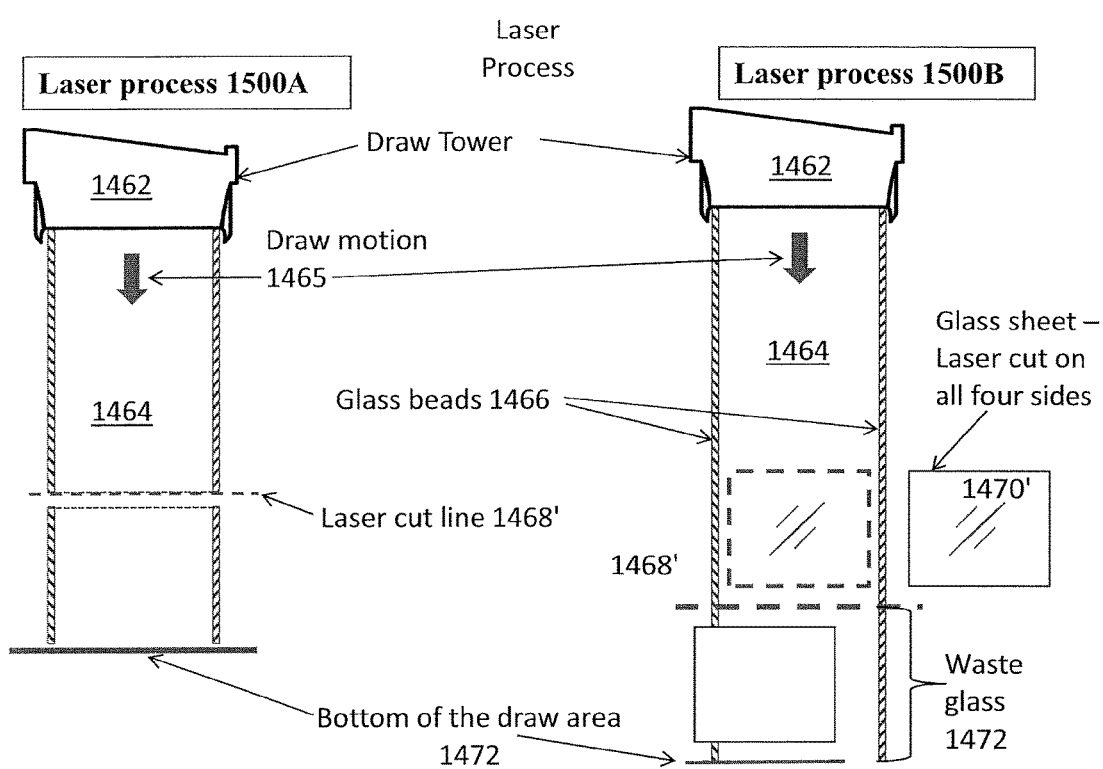
FIG. 15A illustrates a method of laser-based cutting of glass on the glass draw, in which glass plates are separated from the draw using a horizontal laser cut.
FIG. 15B illustrates a method of laser-based cutting of glass on the glass draw, in which a laser is used to cut through the quality areas of the glass sheet and remove a quality section of glass from the draw.

FIGS. 15A-15B illustrate two methods of laser glass cutting on the draw according to methods described herein, utilizing laser optical systems such as those described herein in conjunction with FIGS. 2-6. According to a laser cutting process 1500A, a laser cut line 1468' consisting of a series of defect lines is applied to the glass sheet 1464 formed by the draw tower 1462. In the process 1500A, the laser (not shown) is configured to cut through the entire thickness of the glass sheet 1464. The laser cut line 1468' extends across the entire width of the newly formed glass sheet 1464 on the draw, including cutting the beads 1466 without vibrating the glass ribbon or creating any glass chips or particles.

FIG. 15B illustrates an alternative method 1500B of laser glass cutting on the draw, in which a laser is used to cut through the quality areas of the glass sheet and remove a large rectangular sheet 1470' of glass. Waste glass 1472 is removed from the glass sheet at the bottom 1472 of the draw area. It should be recognized that in other embodiments, the removed glass sheet 1470' need not be rectangular. The glass sheet 1470' can be square or circular or have any other shape required.

Figure 16:
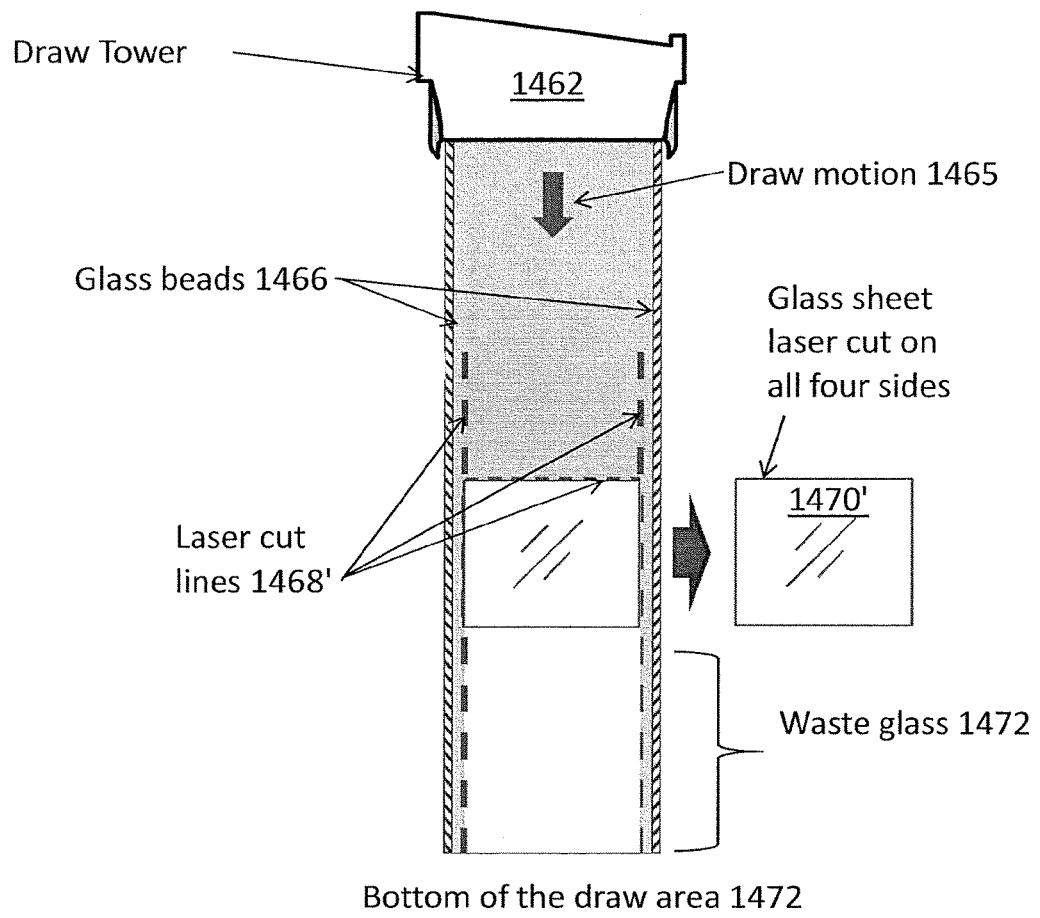
FIG. 16 illustrates laser-based cutting of glass on the draw by cutting beads high in the draw and horizontally cutting the sheet lower in the draw.

FIG. 16 illustrates yet another alternative method of laser glass cutting on the draw. In FIG. 16, vertical laser cut lines 1468' are applied adjacent to the glass beads 1466 relatively higher up in the draw path. Then, relatively lower in the draw path, horizontal laser cut lines 1468' are applied to cut and remove the glass sheet 1470' from the draw.

Figure 17:
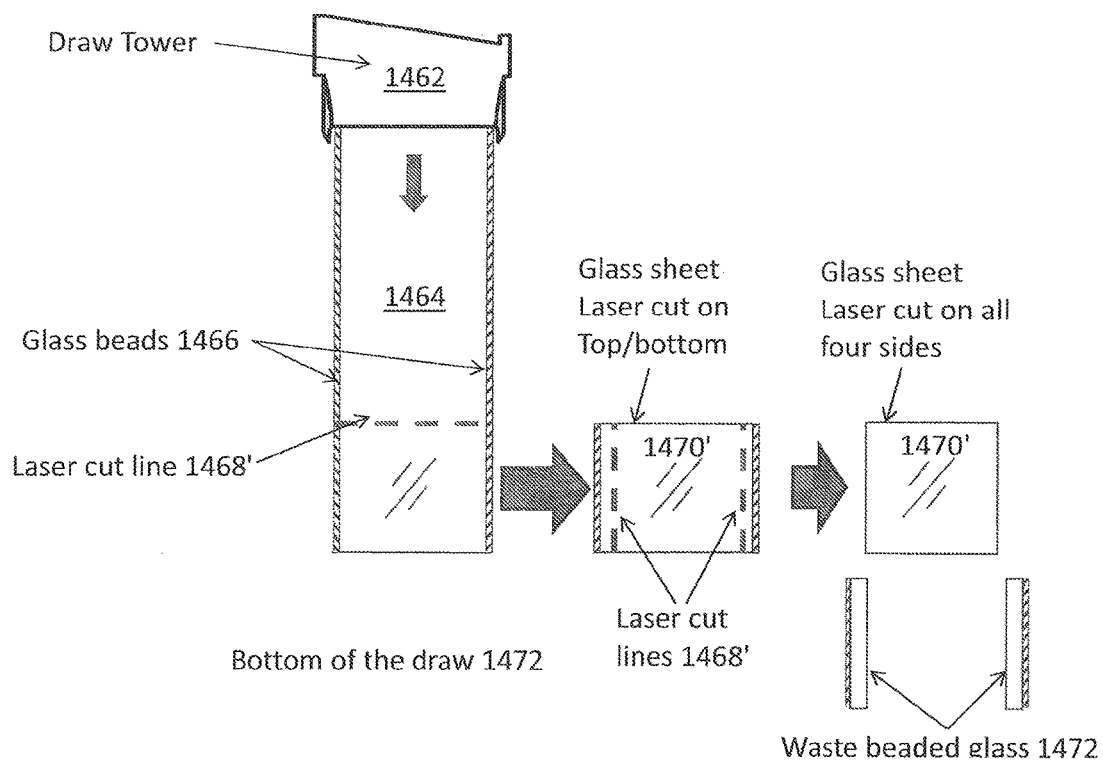
FIG. 17 illustrates laser-based cutting of glass on the draw by cutting horizontally to remove the glass from the draw, followed by separate vertical cuts to remove glass beads.

FIG. 17 illustrates a further alternative method of laser glass cutting on the draw. In FIG. 17, horizontal laser cut lines 1468' is applied on the draw, across the entire width of the glass sheet 1464, to remove the laser cut sheet 1470' from the draw. Following this, vertical laser cut lines 1468' are applied to the cut sheet 1470' to remove the beads from the cut sheet at the bottom of the draw.

Figure 18:
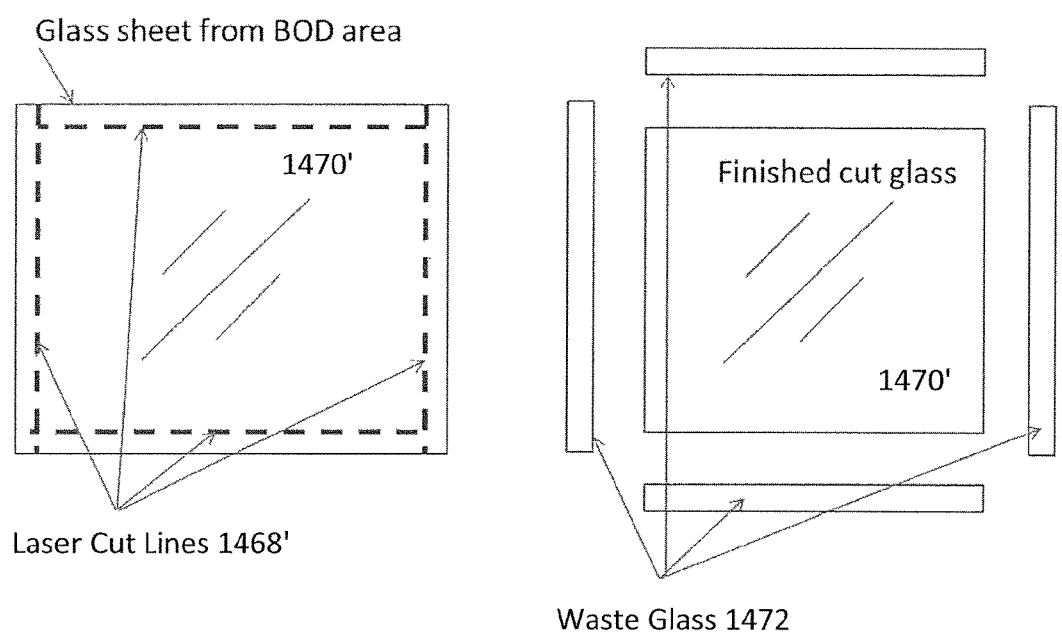
FIG. 18 illustrates laser-based cutting of glass away from the draw to remove trim or waste glass from the sheet.

FIG. 18 illustrates use of the laser methods described herein to remove trim or waste glass 1472 from the sheet 1470' away from the draw. In a finishing area, both horizontal and vertical laser cut lines 1468' are applied to remove the horizontal and vertical pieces of waste glass 1472 from the laser cut glass sheet 1470'.

Glass stresses may also be of particular concern for some applications, particularly for applications with glass sheets or laminated glass sheets that have high stresses. Cutting of sheets under such circumstances with traditional methods presents significant difficulties. For example, significant amounts of stress are induced during the drawing of LCD glass sheets during the fusion draw process. The stress at the sheet and bead interface is even larger during glass cooling because of the differential thickness between sheet and bead and the different associated cooling rates. The stress level can be significantly larger for the case of fusion drawn laminated sheets (>300 MPa), where the viscosity and CTE differences between adjacent sheet layers result in very high outer layer compressive stress. This high compressive stress layer property can significantly improve the glass strength of the laminated glass sheet. However, cutting of the glass sheet by traditional methods can be difficult in sheets with high stress levels.

As is understood in the art, LCD glass sheets made with the fusion draw process have high stresses that are induced as the glass is cooled from above its softening point to much below its strain point. The stress is also significantly higher at the glass bead interface due to differences in thicknesses and thermal mass. The stresses are much higher (>300 MPa) for the case of laminated glass sheets, where the mismatch in CTE and viscosity of glass layers can induce high compressive stresses needed for strengthened glass applications. These high levels of stress make it very difficult to cut the glass sheets at temperatures that are much below the strain point of the glass (<300 C).

Methods and different embodiments are disclosed to cut the sheets and separate beads from the sheet using the laser technology which entails single shot penetration through the thickness of the glass sheet. Methods disclosed herein allow for laser-based cutting of the sheet at the draw and separation of beads to improve the manufacturing efficiency of fusion draw process. Furthermore, in some embodiments, single layer sheets and laminated sheets can be cut at high temperatures (close to the annealing point of the glass), making the induced stress much smaller. The ability to cut sheets at high temperature and then post-process the sheet through prescribed temperature profiles can also accommodate sheets with lower glass compaction, lower residual stresses, the possibility to eliminate the cost of separate finishing steps, the ability to process glasses of higher strain point, and increased production throughput due to the glass staying at the annealing temperature longer.

Figure 19:
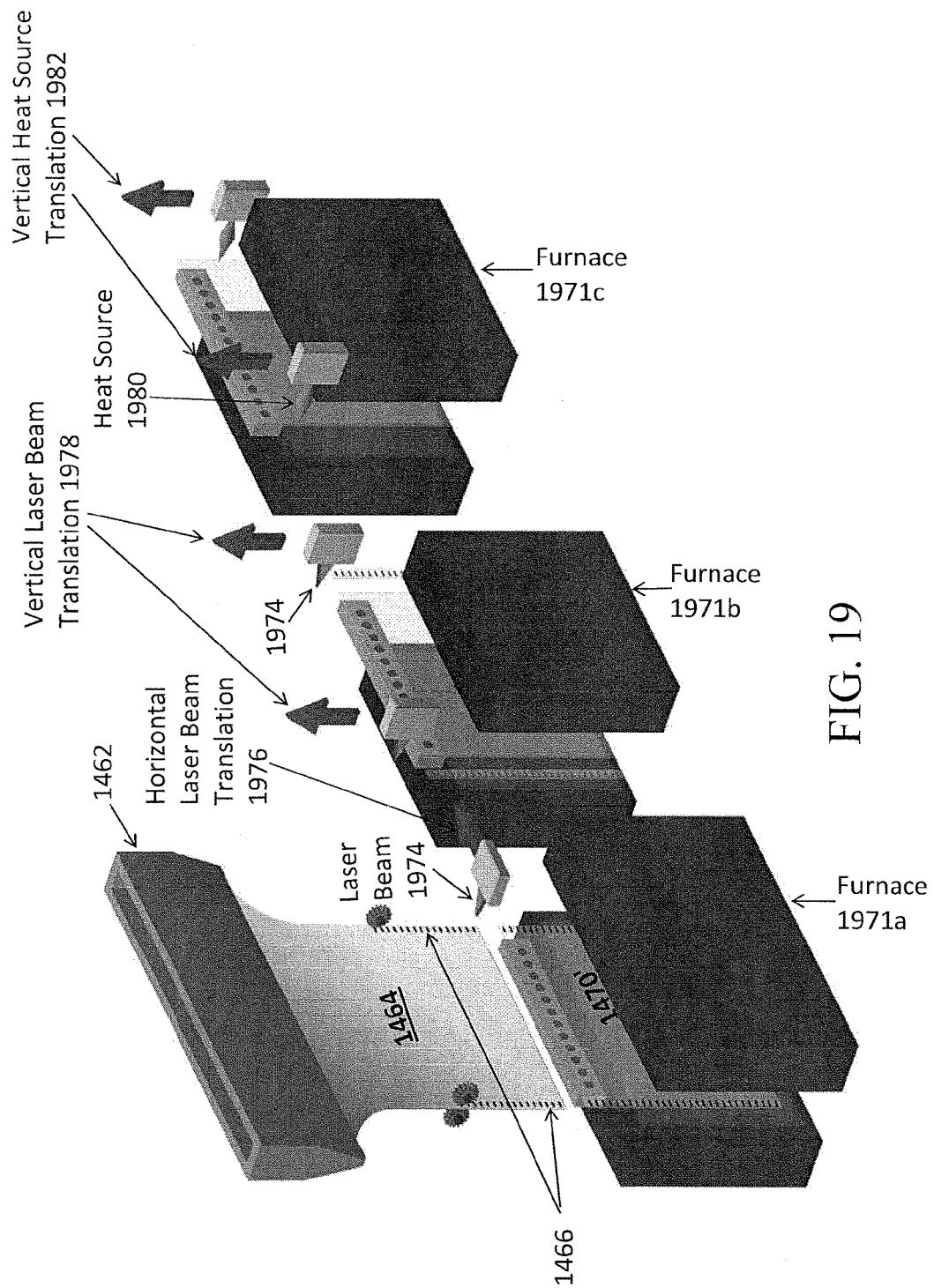
FIG. 19 illustrates a laser-based process of cutting on the draw using a multi-stage furnace to hold the glass sheet at a temperature close to its annealing point.

FIG. 19 illustrates an example process using a multi-stage furnace 1971 designed to hold the glass sheet portion 1470' (to be cut) at a temperature close to its annealing point. At the lower part of the draw, the glass sheet 1470' (to be cut) is introduced into a furnace 1971a held around the annealing temperature of the glass. The lower stress level at the elevated temperatures near the annealing point aid in cutting of the sheet. The sheet 1464 is first cut horizontally by a laser beam 1974 at the draw that undergoes horizontal laser beam translation 1976 to produce a plurality of defect lines in the glass.

The glass sheet 1470' is then translated to furnace 1971b, also held at the annealing temperature of the glass. The glass beads 1466 are separated using the laser beams 1974, which are configured to undergo vertical translation 1974 to laser score the glass sheet 1470' adjacent to the beads 1466. The horizontal and vertical cutting steps can include applying tensile or bending stresses along the laser-damaged contours to separate the glass from the draw and to separate the glass beads from the cut glass sheet 1470' if necessary. The stresses can be applied using robotics, for example.

Following removal of the glass beads, the cut glass sheet 1470' is translated to a third furnace 1971c, where heat sources 1980 undergo vertical translation 1982 to deliver heat to the cut edges of the glass plate 1470'. The heat is applied to smooth and round the cut vertical edges, and while not shown in FIG. 19, heat can also be applied to the horizontal cut edges of the plate 1470' for smoothing and rounding. The heat source can include a gas flame, $CO_2$ laser, etc.

The glass sheet 1464 can be a laminated sheet, where the sheet is comprised of multiple layers, each having different material properties such as CTE, etc. Such a laminated sheet can be formed by using a double-isopipe draw tower in which each isopipe is used for providing glass for a different layer of the laminate. The difference in CTE between glass layers of the laminate results in a significant amount of stress being introduced as the glass sheet cools from above the softening point to much below the strain point. For example, compressive stress of greater than 400 MPa can be induced on the surface of the laminate sheet surface by having CTE difference between the inner and surface layers larger than $60 \times 10^{-7}$/C, with the ratio of the thickness of the inner layer to the total laminate thickness ranging between 0.8 and 1 (see, e.g., Tandon et al., U.S. Patent Application Number 20110318555, the entirety of which is incorporated herein by reference).

In cases in which the glass sheet 1464 is a laminate, the furnaces 1971a and 1971b can be configured to hold the laminate at a temperature that is between the annealing temperatures of two layers of the laminate. For applications where high surface compressive stresses are required (e.g. laminated glasses for high strength applications), providing time at the annealing temperature will reduce the stress magnitude, facilitating cutting using the laser beams 1974. In these cases, high stresses can still be achieved in a finished glass sheet by quenching the glass during the post-cutting cooling.

Figure 20:
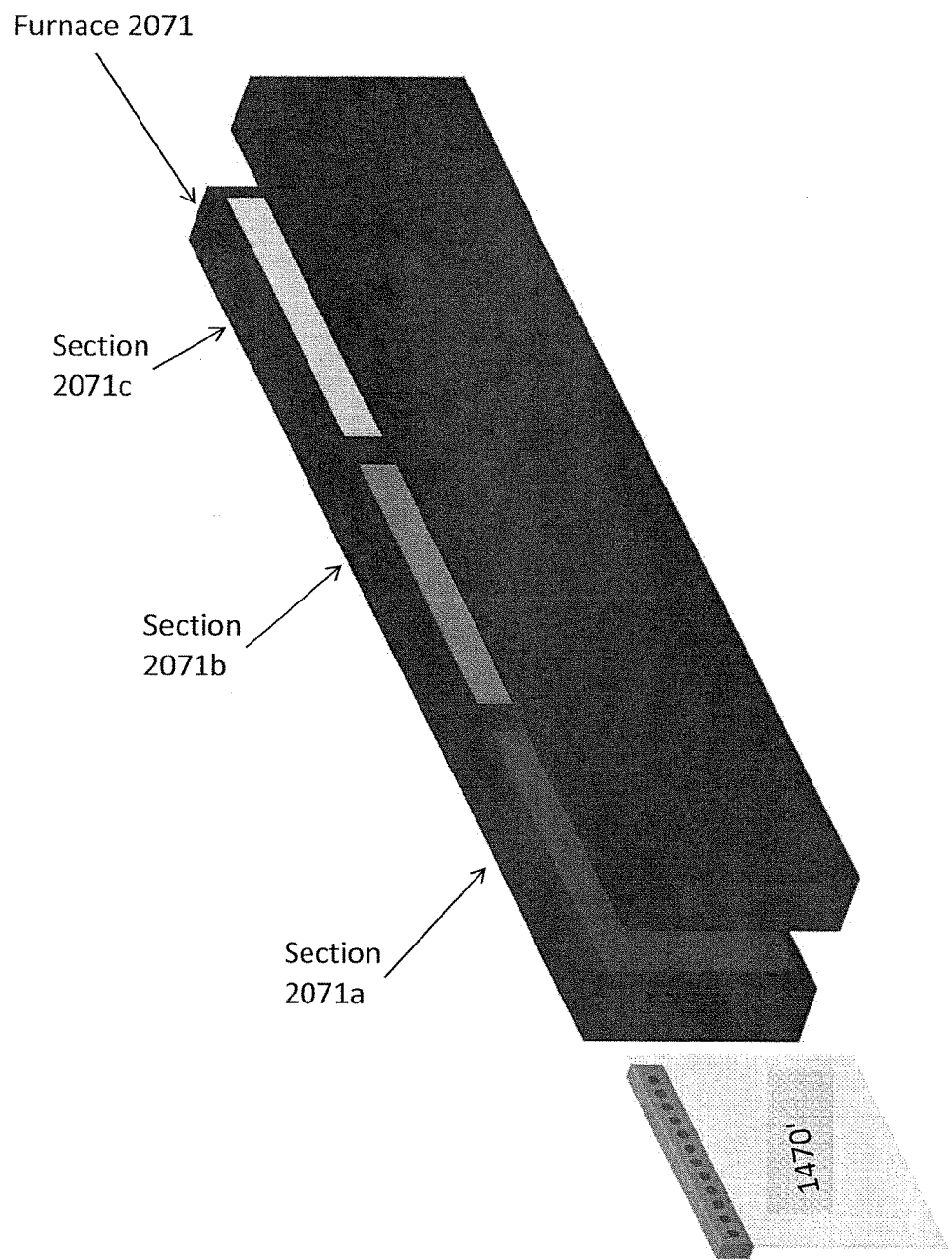
FIG. 20 illustrates a multistage furnace configured to impart a prescribed temperature cooling profile to a glass sheet that is cut on the draw.

FIG. 20 illustrates a process in which the sheet 1470' is cooled to temperatures much below the strain point of the glass by physically traversing the sheet through a multistage furnace 2071 having progressively cooler stages 2071a, 2071b, and 2071c. The series of furnaces apply a prescribed temperature profile to minimize residual stresses, post-formed compaction, improve glass sheet attributes, and tailor glass properties. It should be understood that a similar controlled cooling profile is achieved in other embodiments by using a single-stage furnace with a time-varying temperature profile.

In other embodiments, laser perforations are made with the glass in the draw, with a certain separation between defect lines, at a temperature above the annealing point of the glass. This has no significant impact on glass strength at this draw location. However, this can result in the glass sheet spontaneously separating or separating with only weak external perturbations when CTE stress is developed (e.g., for laminated glass) at downstream locations on the draw. Spontaneous separation, or separation with weak external perturbations, can be useful for removal of glass beads and for glass collection.

The ability to cut sheets at high temperature and then post-process the sheet through prescribed temperature profile can also allow for sheets with lower glass compaction and lower residual stresses. Such ability can also eliminate the cost of separate finishing steps, allow processing of glasses with higher strain points, and increase production throughput due to the glass staying at the annealing temperature longer.

The glass separation along a full-thickness cut is controlled by the pitch between two defect lines. A typical exemplary pitch for cutting many display glass compositions is about 1-5 microns (e.g., 2-5 microns). However, a pitch of up to 8 microns (5-8 microns) has also been shown to provide a good quality cut. The ability to control the pitch is also important since it determines the cutting speed, which is also affected by laser pulse frequency or burst repetition rate, the number of pulses within a burst mode and the average energy per pulse and/or per burst.

When a micro-crack around a defect line is oriented toward an adjacent defect line, glass cutting is facilitated because the micro-crack is aligned with the fault line and guides the direction of separation. In such cases, a larger pitch (for example 3 to 50 microns, such as 3 to 20 microns) between the defect lines may suffice for full glass separation, thus simplifying processing (since fewer defect lines are required to effect separation). Alternatively, in some glass types, where micro-cracks are not formed or are not oriented toward and adjacent defect line, a smaller pitch (0.1 to 3 microns, e.g., between 1 and 3 microns) between the holes (or defect lines) may be required for clean separation.

The relevant teachings of all patents, published applications and references cited herein are incorporated by reference in their entirety.

While exemplary embodiments have been described herein, it will be understood by those skilled in the art that various changes in form and details may be made therein without departing from the scope of the invention encompassed by the appended claims.

What is claimed is:

1. A glass article comprising: a glass composite having a first surface, a second surface, and at least one edge having a plurality of defect lines extending at least 250 microns between the first and second surfaces, the defect lines each having a diameter less than or equal to about 5 microns, the glass composite comprising three layers, wherein the outermost layers are comprised of a first composition having a coefficient of thermal expansion CTE1 and a thickness TH1; and an inner layer situated between the outermost layers, the inner layer comprised of a second composition that is different from the first composition and has a coefficient of thermal expansion CTE2 and a thickness TH2; wherein CTE1 is greater than CTE2.

2. A glass article of claim 1, wherein the glass composite is a fusion formed glass composite.

3. The glass article of claim 1, wherein the spacing of adjacent defect lines is between 0.1 micron and 20 microns.

4. The glass article of claim 1, wherein the outermost glass layers are under compressive stress, and the inner layer is under tensile stress, and the ratio of TH2 to TH1 is between 4 and 20.

5. The glass article of claim 1, wherein the glass article has a central tension of the inner layer greater than 5 MPa.

6. The glass article of claim 1, wherein the defect lines extend a full thickness of the at least one edge.

7. The glass article of claim 1, wherein the at least one edge has an Ra surface roughness less than about 0.5 micron.

8. The glass article of claim 1, wherein the at least one edge has subsurface damage up to a depth less than or equal to about 75 microns.

* * * * *

UNITED STATES PATENT AND TRADEMARK OFFICE
CERTIFICATE OF CORRECTION

PATENT NO. : 10,183,885 B2
APPLICATION NO. : 15/496393
DATED : January 22, 2019
INVENTOR(S) : Dana Craig Bookbinder et al.

It is certified that error appears in the above-identified patent and that said Letters Patent is hereby corrected as shown below:

On the Title Page

On page 2, Column 2, item (56), U.S. patent documents, Line 14, delete "6,501,576" and insert -- 6,501,578 --, therefor.

On page 2, Column 2, item (56), U.S. patent documents, Line 40, delete "8,283,695" and insert -- 8,283,595 --, therefor.

On page 2, Column 2, item (56), U.S. patent documents, Line 45, delete "Abramev et al." and insert -- Abramov et al. --, therefor.

On page 2, Column 2, item (56), U.S. patent documents, Line 53, delete "Abrarnov et al" and insert -- Abramov et al. --, therefor.

On page 2, Column 2, item (56), U.S. patent documents, Line 57, delete "8,635,857" and insert -- 8,635,887 --, therefor.

On page 2, Column 2, item (56), U.S. patent documents, Line 78, delete "2002/0097488" and insert -- 2002/0097486 --, therefor.

On page 3, Column 1, item (56), U.S. patent documents, Line 4, delete "2005/0116938" and insert -- 2005/0115938 --, therefor.

On page 3, Column 2, item (56), U.S. patent documents, Line 61, delete "Heckert et al." and insert -- Hackert et al. --, therefor.

On page 3, Column 2, item (56), U.S. patent documents, Line 72, delete "2015/0350991" and insert -- 2015/0360991 --, therefor.

Signed and Sealed this
Fifteenth Day of October, 2019

Andrei Iancu
*Director of the United States Patent and Trademark Office*

CERTIFICATE OF CORRECTION (continued)
U.S. Pat. No. 10,183,885 B2

On page 4, Column 2, item (56), U.S. patent documents, Line 64, delete "8/2015" and insert -- 6/2015 --, therefor.

On page 5, Column 2, item (56), other publications, Line 50, delete "ofexicons" and insert -- of axicons --, therefor.

On page 6, Column 2, item (56), other publications, Line 10, delete "modes: modes;" and insert -- modes; --, therefor.

On page 6, Column 2, item (56), other publications, Lines 35-36, delete "Eelectropolishing" and insert -- Electropolishing --, therefor.